United States Patent
Kummetz et al.

(10) Patent No.: US 10,499,253 B2
(45) Date of Patent: Dec. 3, 2019

(54) DISTRIBUTED ANTENNA SYSTEM FOR WIRELESS NETWORK SYSTEMS

(71) Applicant: CommScope Technologies LLC, Hickory, NC (US)

(72) Inventors: Thomas Kummetz, Forest, VA (US); Donald R. McAllister, Lynchburg, VA (US); Carmine Pagano, Blairstown, NJ (US); Hongju Yan, Morganville, NJ (US); Dennis M. Cleary, Pittsford, NY (US); Van Hanson, Forest, VA (US); Mathias Schmalisch, Augsburg (DE); Stefan Eisenwinter, Buchdorf (DE)

(73) Assignee: CommScope Technologies LLC, Hickory, NC (US)

( * ) Notice: Subject to any disclaimer, the term of this patent is extended or adjusted under 35 U.S.C. 154(b) by 708 days.

(21) Appl. No.: 13/713,070

(22) Filed: Dec. 13, 2012

(65) Prior Publication Data

US 2013/0121703 A1 May 16, 2013

Related U.S. Application Data

(63) Continuation of application No. 12/431,872, filed on Apr. 29, 2009, now Pat. No. 8,346,091.

(51) Int. Cl.
*H04B 10/2575* (2013.01)
*H04W 16/14* (2009.01)
(Continued)

(52) U.S. Cl.
CPC ........ *H04W 16/14* (2013.01); *H04B 10/2575* (2013.01); *H04B 10/25753* (2013.01); *H04W 88/06* (2013.01); *H04W 88/085* (2013.01)

(58) Field of Classification Search
CPC ............. H04W 88/085; H04B 10/2575; H04B 10/25753
(Continued)

(56) References Cited

U.S. PATENT DOCUMENTS

| | | |
|---|---|---|
| 4,922,257 A | 5/1990 | Saito et al. |
| 4,947,133 A | 8/1990 | Thomas |

(Continued)

FOREIGN PATENT DOCUMENTS

| | | |
|---|---|---|
| CN | 1745590 A | 3/2006 |
| CN | 101127564 A | 2/2008 |

(Continued)

OTHER PUBLICATIONS

"Interface." Merriam-Webster.com. Merriam-Webster, n.d. Web. Sep. 29, 2015. <http://www.merriam-webster.com/dictionary/interface>.*

(Continued)

*Primary Examiner* — Tanya T Motsinger
(74) *Attorney, Agent, or Firm* — Fogg & Powers LLC

(57) ABSTRACT

A distributed antenna system is provided for communicating with a plurality of base stations. The distributed antenna system includes a system controller and a master unit communicating with at least one of the plurality of base stations. A remote unit communicates over a high data rate media with the master unit and/or a downstream remote unit. Alternatively, the distributed antenna system includes a controller and a digital time/space crosspoint switch controlled by the controller. A digitizing transceiver is in communication with the digital time/space crosspoint switch. The crosspoint switch is configured to transmit and receive digital data through the digitizing transceiver.

19 Claims, 20 Drawing Sheets

(51) Int. Cl.
*H04W 88/08* (2009.01)
*H04W 88/06* (2009.01)

(58) Field of Classification Search
USPC .................................. 398/115–117
See application file for complete search history.

(56) References Cited

U.S. PATENT DOCUMENTS

| | | |
|---|---|---|
| 5,191,598 A | 3/1993 | Backstrom et al. |
| 5,257,415 A | 10/1993 | Kumagai et al. |
| 5,280,472 A | 1/1994 | Gilhousen et al. |
| 5,396,522 A * | 3/1995 | Laflin .................. H03L 7/0807 327/141 |
| 5,550,893 A * | 8/1996 | Heidari ................... H04B 1/40 375/216 |
| 5,579,341 A | 11/1996 | Smith et al. |
| 5,603,080 A | 2/1997 | Kaellender et al. |
| 5,621,786 A | 4/1997 | Fischer et al. |
| 5,627,879 A * | 5/1997 | Russell ............... H04W 88/085 370/328 |
| 5,642,405 A | 6/1997 | Fischer et al. |
| 5,644,622 A | 7/1997 | Russell et al. |
| 5,657,374 A | 8/1997 | Russell et al. |
| 5,677,860 A | 10/1997 | Yazawa et al. |
| 5,719,867 A | 2/1998 | Borazjani |
| 5,761,619 A | 6/1998 | Danne et al. |
| 5,809,422 A | 9/1998 | Raleigh et al. |
| 5,852,651 A | 12/1998 | Fischer et al. |
| 5,854,986 A | 12/1998 | Dorren et al. |
| 5,856,804 A | 1/1999 | Turcotte et al. |
| 5,867,763 A | 2/1999 | Dean et al. |
| 5,903,834 A | 5/1999 | Wallstedt et al. |
| 5,926,476 A | 7/1999 | Ghaibeh |
| 5,940,384 A | 8/1999 | Carney et al. |
| 5,940,451 A | 8/1999 | Kim |
| 5,978,365 A | 11/1999 | Yi |
| 6,028,850 A | 2/2000 | Kang |
| 6,112,086 A | 8/2000 | Wala |
| 6,147,786 A | 11/2000 | Pan |
| 6,167,099 A | 12/2000 | Rader et al. |
| 6,178,194 B1 | 1/2001 | Vasic |
| 6,205,133 B1 | 3/2001 | Bexten |
| 6,212,172 B1 | 4/2001 | Barabash et al. |
| 6,247,035 B1 | 6/2001 | Hellberg |
| 6,259,910 B1 | 7/2001 | Fairfield et al. |
| 6,282,184 B1 | 8/2001 | Lehman et al. |
| 6,307,877 B1 | 10/2001 | Philips et al. |
| 6,348,874 B1 | 2/2002 | Cole et al. |
| 6,434,187 B1 | 8/2002 | Beard et al. |
| 6,539,239 B1 | 3/2003 | Loughran et al. |
| 6,577,686 B1 | 6/2003 | Koga et al. |
| 6,603,806 B2 | 8/2003 | Martone |
| 6,650,649 B1 | 11/2003 | Muhammad et al. |
| 6,697,603 B1 | 2/2004 | Lovinggood et al. |
| 6,704,545 B1 | 3/2004 | Wala |
| 6,724,834 B2 | 4/2004 | Garrett et al. |
| 6,731,678 B1 * | 5/2004 | White .................. H04L 5/0007 375/219 |
| 6,771,933 B1 | 8/2004 | Eng et al. |
| 6,785,558 B1 * | 8/2004 | Stratford ............. H04W 88/085 455/561 |
| 6,801,767 B1 * | 10/2004 | Schwartz ......... H04B 10/25755 398/115 |
| 6,864,818 B1 * | 3/2005 | Hezar .................... H03M 3/396 341/143 |
| 6,920,127 B2 | 7/2005 | Ozluturk et al. |
| 6,930,990 B2 | 8/2005 | Dajer et al. |
| 6,937,878 B2 | 8/2005 | Kim et al. |
| 6,963,552 B2 * | 11/2005 | Sabat, Jr. ............. H04W 16/14 370/338 |
| 6,980,774 B2 | 12/2005 | Shi |
| 7,013,087 B2 | 3/2006 | Suzuki et al. |
| 7,020,451 B2 | 3/2006 | Sugar et al. |
| 7,035,671 B2 | 4/2006 | Solum |
| 7,039,399 B2 | 5/2006 | Fischer |
| 7,047,028 B2 | 5/2006 | Cagenius |
| 7,058,037 B1 | 6/2006 | Moon |
| 7,062,246 B2 | 6/2006 | Owen |
| 7,072,586 B2 | 7/2006 | Aburakawa et al. |
| 7,075,903 B1 | 7/2006 | Solum |
| 7,079,599 B2 | 7/2006 | Karaoguz |
| 7,088,794 B2 | 8/2006 | Nichols |
| 7,103,377 B2 | 9/2006 | Bauman et al. |
| 7,151,740 B2 | 12/2006 | Zhang et al. |
| 7,155,176 B2 | 12/2006 | Komaili et al. |
| 7,171,244 B2 | 1/2007 | Bauman |
| 7,184,728 B2 | 2/2007 | Solum |
| 7,194,049 B2 | 3/2007 | Dhalla et al. |
| 7,230,957 B2 | 6/2007 | Kang et al. |
| 7,352,310 B2 | 4/2008 | Mori et al. |
| 7,356,075 B2 | 4/2008 | Bergstrom et al. |
| 7,359,392 B2 | 4/2008 | Bianchi et al. |
| 7,388,931 B1 | 6/2008 | Hsu et al. |
| 7,394,870 B2 | 7/2008 | Chien et al. |
| 7,403,556 B2 | 7/2008 | Kao et al. |
| 7,433,347 B1 | 10/2008 | Trott et al. |
| 7,450,911 B1 | 11/2008 | Venkatesh |
| 7,483,678 B2 | 1/2009 | Rozenblit et al. |
| 7,508,890 B1 | 3/2009 | Malone et al. |
| 7,515,929 B2 | 4/2009 | Ramachandran et al. |
| 7,539,509 B2 | 5/2009 | Bauman et al. |
| 7,565,125 B2 | 7/2009 | Audinot et al. |
| 7,565,170 B2 | 7/2009 | Buscaglia et al. |
| 7,573,410 B2 | 8/2009 | Georgantas et al. |
| 7,573,862 B2 | 8/2009 | Chambers et al. |
| 7,583,765 B2 | 9/2009 | Beamish |
| 7,599,711 B2 * | 10/2009 | Hermel ................ H04W 16/26 455/456.2 |
| 7,603,093 B2 | 10/2009 | Kremer et al. |
| 7,610,046 B2 | 10/2009 | Wala |
| 7,630,296 B2 | 12/2009 | Zavadsky et al. |
| 7,639,982 B2 | 12/2009 | Wala |
| 7,668,153 B2 | 2/2010 | Zavadsky |
| 7,688,776 B2 | 3/2010 | Sexton et al. |
| 7,688,923 B2 | 3/2010 | Capretta |
| 7,702,291 B2 | 4/2010 | Hansen |
| 7,760,816 B2 | 7/2010 | Sobchak et al. |
| 7,761,093 B2 | 7/2010 | Sabat, Jr. et al. |
| 7,787,854 B2 | 8/2010 | Conyers et al. |
| 7,805,073 B2 | 9/2010 | Sabat, Jr. et al. |
| 7,809,047 B2 | 10/2010 | Kummetz |
| 7,835,327 B2 | 11/2010 | Hahm et al. |
| 7,848,731 B1 | 12/2010 | Dianda et al. |
| 7,848,747 B2 | 12/2010 | Wala |
| 7,848,770 B2 | 12/2010 | Scheinert |
| 7,860,188 B2 | 12/2010 | Jensen |
| 7,885,355 B2 | 2/2011 | Perraud et al. |
| 7,974,244 B2 | 7/2011 | Hermel |
| 7,991,013 B2 | 8/2011 | Gupta et al. |
| 8,005,050 B2 | 8/2011 | Scheinert et al. |
| 8,005,152 B2 * | 8/2011 | Wegener .................. H03M 7/40 375/241 |
| 8,019,396 B2 | 9/2011 | Wayman |
| 8,036,617 B2 | 10/2011 | Olgaard |
| 8,050,237 B2 | 11/2011 | Kong et al. |
| 8,126,420 B2 | 2/2012 | Koroglu et al. |
| 8,135,102 B2 | 3/2012 | Wiwel et al. |
| 8,174,428 B2 | 5/2012 | Wegener |
| 8,175,459 B2 | 5/2012 | Thelen et al. |
| 8,213,401 B2 | 7/2012 | Fischer et al. |
| 8,254,481 B1 | 8/2012 | McCloskey et al. |
| 8,260,143 B2 | 9/2012 | Gupta et al. |
| 8,260,279 B2 | 9/2012 | Kiasaleh et al. |
| 8,270,387 B2 | 9/2012 | Cannon et al. |
| 8,270,502 B2 | 9/2012 | Lai |
| 8,306,563 B2 | 11/2012 | Zavadsky et al. |
| 8,315,293 B2 | 11/2012 | Wenzel et al. |
| 8,320,433 B2 | 11/2012 | Wegener |
| 8,346,091 B2 | 1/2013 | Kummetz et al. |
| 8,385,483 B2 | 2/2013 | Abdelmonem et al. |
| 8,626,245 B2 | 1/2014 | Zavadsky et al. |
| 8,724,664 B2 | 5/2014 | Stapleton et al. |
| 8,737,454 B2 | 5/2014 | Wala et al. |

(56) References Cited

U.S. PATENT DOCUMENTS

| | | | |
|---|---|---|---|
| 8,885,652 B2 | 11/2014 | Dai | |
| 8,948,155 B2 | 2/2015 | Cannon et al. | |
| 9,055,472 B2 | 6/2015 | Wegener et al. | |
| RE47,160 E * | 12/2018 | Fischer | H04B 7/2606 |
| 2001/0031646 A1 * | 10/2001 | Williams | H04B 7/2612 |
| | | | 455/560 |
| 2002/0080448 A1 * | 6/2002 | Kim | H04B 10/25753 |
| | | | 398/115 |
| 2002/0102972 A1 | 8/2002 | Hirama | |
| 2002/0154687 A1 | 10/2002 | Bierly et al. | |
| 2003/0007502 A1 | 1/2003 | Dove et al. | |
| 2003/0185571 A1 | 10/2003 | Lee et al. | |
| 2004/0004943 A1 * | 1/2004 | Kim | H04W 88/085 |
| | | | 370/310 |
| 2004/0106435 A1 | 6/2004 | Bauman et al. | |
| 2004/0132474 A1 | 7/2004 | Wala | |
| 2004/0203339 A1 * | 10/2004 | Bauman | H04B 7/0842 |
| | | | 455/7 |
| 2004/0223539 A1 * | 11/2004 | Yang | H04B 1/7115 |
| | | | 375/148 |
| 2005/0093726 A1 * | 5/2005 | Hezar | H03M 3/412 |
| | | | 341/143 |
| 2005/0123301 A1 | 6/2005 | Kallstenius | |
| 2005/0157675 A1 | 7/2005 | Feder et al. | |
| 2005/0182760 A1 | 8/2005 | Lee et al. | |
| 2005/0233715 A1 | 10/2005 | Laroia et al. | |
| 2005/0259724 A1 | 11/2005 | Bergstrom et al. | |
| 2006/0063490 A1 * | 3/2006 | Bader | H04B 1/0483 |
| | | | 455/45 |
| 2006/0172775 A1 * | 8/2006 | Conyers | H04W 84/14 |
| | | | 455/561 |
| 2007/0008939 A1 * | 1/2007 | Fischer | H04W 88/085 |
| | | | 370/338 |
| 2007/0027943 A1 | 2/2007 | Jensen et al. | |
| 2007/0086544 A1 | 4/2007 | Fudge et al. | |
| 2007/0117592 A1 | 5/2007 | Bauman | |
| 2007/0149158 A1 | 6/2007 | Brobston et al. | |
| 2007/0160012 A1 | 7/2007 | Liu | |
| 2007/0195905 A1 | 8/2007 | Schatz | |
| 2007/0238457 A1 | 10/2007 | Wala | |
| 2007/0264009 A1 | 11/2007 | Sabat, Jr. et al. | |
| 2007/0286599 A1 | 12/2007 | Sauer et al. | |
| 2008/0145061 A1 | 6/2008 | Lee et al. | |
| 2008/0181171 A1 | 7/2008 | Koziy et al. | |
| 2008/0181282 A1 * | 7/2008 | Wala | H04B 1/18 |
| | | | 375/130 |
| 2008/0232305 A1 | 9/2008 | Oren et al. | |
| 2008/0240164 A1 | 10/2008 | Zavadsky | |
| 2008/0240225 A1 | 10/2008 | Zavadsky et al. | |
| 2008/0242232 A1 | 10/2008 | Zavadsky et al. | |
| 2009/0040107 A1 * | 2/2009 | Yun | H01Q 3/2605 |
| | | | 342/375 |
| 2009/0067363 A1 * | 3/2009 | Ruiz | H04W 24/00 |
| | | | 370/315 |
| 2009/0075644 A1 | 3/2009 | Hermel | |
| 2009/0180426 A1 * | 7/2009 | Sabat | H04W 88/085 |
| | | | 370/328 |
| 2009/0252205 A1 | 10/2009 | Rheinfelder et al. | |
| 2009/0290632 A1 * | 11/2009 | Wegener | H03M 7/30 |
| | | | 375/240 |
| 2009/0316608 A1 * | 12/2009 | Singh | H04W 88/085 |
| | | | 370/280 |
| 2009/0316611 A1 * | 12/2009 | Stratford | H04J 3/0608 |
| | | | 370/294 |
| 2010/0040372 A1 * | 2/2010 | Gejbrowitz | H04B 10/25754 |
| | | | 398/71 |
| 2010/0056201 A1 | 3/2010 | Akamine et al. | |
| 2010/0130153 A1 | 5/2010 | Khoini-Poorfard et al. | |
| 2010/0135674 A1 | 6/2010 | Hermel | |
| 2010/0178936 A1 | 7/2010 | Wale et al. | |
| 2010/0208777 A1 | 8/2010 | Ogaz | |
| 2010/0266287 A1 | 10/2010 | Adhikari et al. | |
| 2010/0278530 A1 * | 11/2010 | Kummetz | H04W 88/085 |
| | | | 398/41 |
| 2010/0303134 A1 | 12/2010 | Kawasaki | |
| 2011/0045787 A1 | 2/2011 | Jin et al. | |
| 2011/0135013 A1 | 6/2011 | Wegener | |
| 2011/0135308 A1 * | 6/2011 | Tarlazzi | H04B 7/0413 |
| | | | 398/79 |
| 2011/0201368 A1 | 8/2011 | Faccin et al. | |
| 2011/0237210 A1 | 9/2011 | Jung et al. | |
| 2011/0310948 A1 | 12/2011 | Ramesh et al. | |
| 2012/0014421 A1 | 1/2012 | Wegener | |
| 2012/0027145 A1 * | 2/2012 | Uyehara | H04J 3/0685 |
| | | | 375/356 |
| 2012/0039320 A1 | 2/2012 | Lemson et al. | |
| 2012/0093084 A1 | 4/2012 | Wala et al. | |
| 2012/0176966 A1 * | 7/2012 | Ling | H04B 1/40 |
| | | | 370/328 |
| 2012/0183289 A1 * | 7/2012 | Lou | H04B 10/272 |
| | | | 398/9 |
| 2012/0184268 A1 | 7/2012 | Sabat, Jr. et al. | |
| 2012/0250740 A1 * | 10/2012 | Ling | H04W 88/085 |
| | | | 375/219 |
| 2012/0314797 A1 * | 12/2012 | Kummetz | H04L 27/34 |
| | | | 375/295 |
| 2013/0003658 A1 | 1/2013 | Stewart et al. | |
| 2013/0004185 A1 * | 1/2013 | Bang | H04B 10/278 |
| | | | 398/173 |
| 2013/0017863 A1 * | 1/2013 | Kummetz | H04W 16/04 |
| | | | 455/562.1 |
| 2013/0079035 A1 | 3/2013 | Wala et al. | |
| 2013/0188753 A1 | 7/2013 | Tarlazzi et al. | |
| 2013/0308537 A1 | 11/2013 | Kummetz et al. | |
| 2014/0119281 A1 | 5/2014 | Kummetz et al. | |
| 2014/0269859 A1 * | 9/2014 | Hanson | H04B 1/40 |
| | | | 375/219 |
| 2014/0269966 A1 | 9/2014 | Faccin et al. | |
| 2014/0314061 A1 | 10/2014 | Trajkovic et al. | |
| 2014/0376499 A1 * | 12/2014 | Kummetz | H04W 24/02 |
| | | | 370/329 |
| 2015/0023444 A1 | 1/2015 | Tarlazzi et al. | |
| 2015/0063273 A1 * | 3/2015 | Kummetz | H04L 1/00 |
| | | | 370/329 |
| 2015/0296527 A1 * | 10/2015 | Ranson | H04W 88/085 |
| | | | 370/329 |
| 2015/0373722 A1 | 12/2015 | Lange | |
| 2016/0050630 A1 | 2/2016 | Weckerle et al. | |
| 2016/0065293 A1 | 3/2016 | Tarlazzi et al. | |
| 2018/0083726 A1 * | 3/2018 | Mitton, Jr. | H04W 16/28 |

FOREIGN PATENT DOCUMENTS

| | | |
|---|---|---|
| CN | 101283551 A | 10/2008 |
| CN | 102484894 | 5/2012 |
| DE | 19833967 A1 | 2/2000 |
| EP | 0664621 A1 | 7/1995 |
| EP | 2425676 | 3/2012 |
| WO | 1998040968 A2 | 9/1998 |
| WO | 1999052308 A1 | 10/1999 |
| WO | 03079645 | 9/2003 |
| WO | 2004051322 | 6/2004 |
| WO | 2004051873 | 6/2004 |
| WO | 2005011151 | 2/2005 |
| WO | 2005034544 | 4/2005 |
| WO | 2005099282 | 10/2005 |
| WO | 2006040653 A1 | 4/2006 |
| WO | 2006135139 A1 | 12/2006 |
| WO | 2006136811 | 12/2006 |
| WO | 2007146214 A1 | 12/2007 |
| WO | 2012024349 A1 | 2/2012 |
| WO | 2014070236 A1 | 5/2014 |

OTHER PUBLICATIONS

Ariyavisitakul et al., "Performance of Simulcast Wireless Techniques for Personal Communication Systems," *IEEE Journal on Selected Areas in Communications*, May 1996, vol. 14, No. 4, pp. 632-643.

(56) References Cited

OTHER PUBLICATIONS

"CPRI Specification V1.4: Common Public Radio Interface (CPRI); Interface Specification," Ericsson AB, Huawei Technologies Co. Ltd, NEC Corporation, Nortel Networks SA and Siemens AG, Mar. 31, 2006, pp. 1-64.
"CPRI Specification V4.0: Common Public Radio Interface (CPRI); Interface Specification," Ericsson AB, Huawei Technologies Co. Ltd, NEC Corporation, Nortel Networks Ltd, Alcatel Lucent, and Nokia Siemens Networks GmbH & Co. KG, Jun. 30, 2008, pp. 1-96.
"EIA Interim Standard-19-B: Recommended Minimum Standards for 800-MHZ Cellular Subscriber Units," Electronic Industries Association, US, May 1988, pp. 1-2.
"EIA/TIA Standard-553: Mobile Station—Land Station Compatibility Specification," Electronic Industries Association and Telecommunication Industry Association, US, Sep. 1989, pp. 1-2.
International Patent Application No. PCT/US2013/031933, "International Search Report," dated Jul. 26, 2013, 4 pages.
International Patent Application No. PCT/US2013/031933, "Written Opinion," dated Jul. 26, 2013, 6 pages.
Kohno, "Structures and Theories of Software Antennas for Software Defined Radio," *IEICE Trans. Commun.*, vol. E83-B, No. 6, Jun. 2000, pp. 1189-1199.
Mitchell, "Data transmission using a spectrum sliced, radio-over-fibre link," Proceedings of the SPIE 6194, The International Society for Optical Engineering, Millimeter-Wave and Terahertz Photonics, 619404, Apr. 19, 2006.
Mitchell , "Radio-over-fibre using spectrum sliced optical links," Proceedings of SPIE, Microwave and Terahertz Photonics, vol. 5466, Apr. 2004, pp. 19-26.
Morell et al., "SAT03-3: Joint Time Slot Optimization and Fair Bandwidth Allocation for DVB-RCS Systems," Global Telecommunications Conference, Globecom '06, IEEE, 2006, pp. 1-5.
"Preliminary Cellular Mobile Telephone Equipment Specification," Advanced Mobile Phone Services, Inc., US, Oct. 1983, pp. 1-4.
Razavilar et al., "Software Radio Architecture with Smart Antennas: A Tutorial on Algorithms and Complexity," *IEEE Journal on Selected Areas in Communications*, Apr. 1999, vol. 17, No. 4, pp. 662-676.
Robins, "A Front End Filter Subsystem for an Adaptive Radar Signal Processor," *Technical Report 912*, Jul. 12, 1991, 89 pages.
Saghir et al., "Reconfigurable Baseband Blocks for Wireless Multistandard Transceivers," Department of Electrical and Computer Engineering, American University of Beirut, US, May 23, 2006, 99 pages.
Staszewski et al., "Digital RF Processor Techniques for Single-Chip Radios," IEEE 2006 Custom Integrated Circuits Conference, Sep. 2006, pp. 789-796.
Thandri, "Design of RF/IF Analog to Digital Converters for Software Radio Communication Receivers," Dissertation, Office of Graduate Studies of Texas A&M University, US, May 2006, pp. 1-203.
Van Den Enden et al., "Digital Signalverarbeitung," Springer Fachmedien Wiesbaden GmbH, Weisbaden, Germany, 1990, 191 pages.
Wala, "A New Microcell Architecture Using Digital Optical Transport," 43$^{rd}$ IEEE Vehicular Technology Conference, May 18-20, 1993, pp. 585-588.
Yoong et al., "Mini-slot TDM WDM optical networks," Photonic Network Communications, vol. 15, No. 2, Apr. 2008, pp. 91-100.
Chinese Patent Application No. CN201080026321.9, Office Action dated Jan. 17, 2014, 24 pages.
International Patent Application No. PCT/US2010/028478, International Search Report and Written Opinion dated Sep. 1, 2010 (9 pages).
U.S. Appl. No. 12/431,872, Non-Final Office Action dated May 24, 2012 (26 pages).
U.S. Appl. No. 12/431,872, Response to Non-Final Office Action filed Aug. 9, 2012 (23 pages).
U.S. Appl. No. 12/431,872, Notice of Allowance dated Sep. 14, 2012 (12 pages).
Chinese Patent Application No. CN201080026321.9 , Second Office Action, dated Nov. 15, 2014, 7 pages.
U.S. Appl. No. 13/951,880, Non-Final Office Action, dated Jun. 18, 2015, 19 pages.
Australian Patent Application No. 2010241944, Patent Examination Report No. 1, dated Jun. 15, 2015, 3 pages.
Australian Patent Office, "Notice of Allowance for AU Application No. 2012041944", "from Foreign Counterpart to U.S. Appl. No. 12/431,872", dated Oct. 19, 2015, pp. 1-39, Published in: AU.
U.S. Patent Office, "Restriction Requirement", "from U.S. Appl. No. 12/431,872", dated Feb. 15, 2012, pp. 1-6, Published in: US.
U.S. Patent Office, "Final Office Action", "U.S. Appl. No. 13/951,880", dated Dec. 11, 2015, pp. 1-28, Published in: US.
U.S. Patent Office, "Office Action", "from U.S. Appl. No. 13/951,880", dated Apr. 26, 2016, pp. 1-28, Published in: US.
Hargrave, "Base Station", "Hargrave's Communications Dictionary, Wiley, 2001", Publisher: Credo Reference. Retrieved from http://search.credoreference.com/content/entry/hargravecomms/base_station/0 on Nov. 20, 2015.
U.S. Patent Office, "Office Action", "from U.S. Appl. No. 14/536,012", dated Sep. 15, 2015, pp. 1-28, Published in: US.
United States Patent and Trademark Office, "Notice of Allowance", "From US. Appl. No. 13/951,880", dated Jul. 13, 2017, pp. 1-16, Published in: US.
European Patent Office, "Communication Pursuant to Article 94(3) for EP Application No. 10722453,7", "Foreign Counterpart to U.S. Appl. No. 12/431,872", dated Dec. 13, 2017, pp. 1-5, Published in: EP.
U.S. Appl. No. 14/536,012, Non-Final Office Action, dated Sep. 15, 2015, 14 pages.
United Statets Patent and Trademark Office, "Final Office Action", "from U.S. Appl. No. 13/951,880", dated Oct. 26, 2016, pp. 1-29, Published in: US.
European Patent Office, "Office Action for EP Application No. 10722453.7 dated Oct. 6, 2016", "from Foreign Counterpart of U.S. Appl. No. 12/431,872", filed Oct. 6, 2016, pp. 1-6, Published in: EP.
United States Patent and Trademark Office, "Advisory Action", "from U.S. Appl. No. 13/951,880", dated Mar. 13, 2017, pp. 1-5, Published in: US.
The Patent Office, P.R. China, "Office Action from CN Application No. 2015104903878 dated Oct. 17, 2018", from Foreign Counterpart to U.S. Appl. No. 12/431,872, dated Oct. 17, 2018, pp. 1-8, Published: CN.
The Patent Office, P.R. China, "Office Action from CN Application No. 2015104903878 dated Dec. 28, 2017", from Foreign Counterpart to U.S. Appl. No. 12/431,872, dated Dec. 28, 2017, pp. 1-13, Published: CN.
U.S. Patent and Trademark Office, "Interview Summary", U.S. Appl. No. 13/951,880, dated Jan. 20, 2017, pp. 1-13, Published: US.
U.S. Patent and Trademark Office, "Interview Summary", U.S. Appl. No. 13/951,880, dated Feb. 17, 2016, pp. 1-3, Published: US.
European Patent Office, "Communication under Rule 71(3) from EP Application No. 10722453.7 dated Mar. 29, 2019", from Foreign Counterpart to U.S. Appl. No. 12/431,872, pp. 1-61, Published: EP.

* cited by examiner

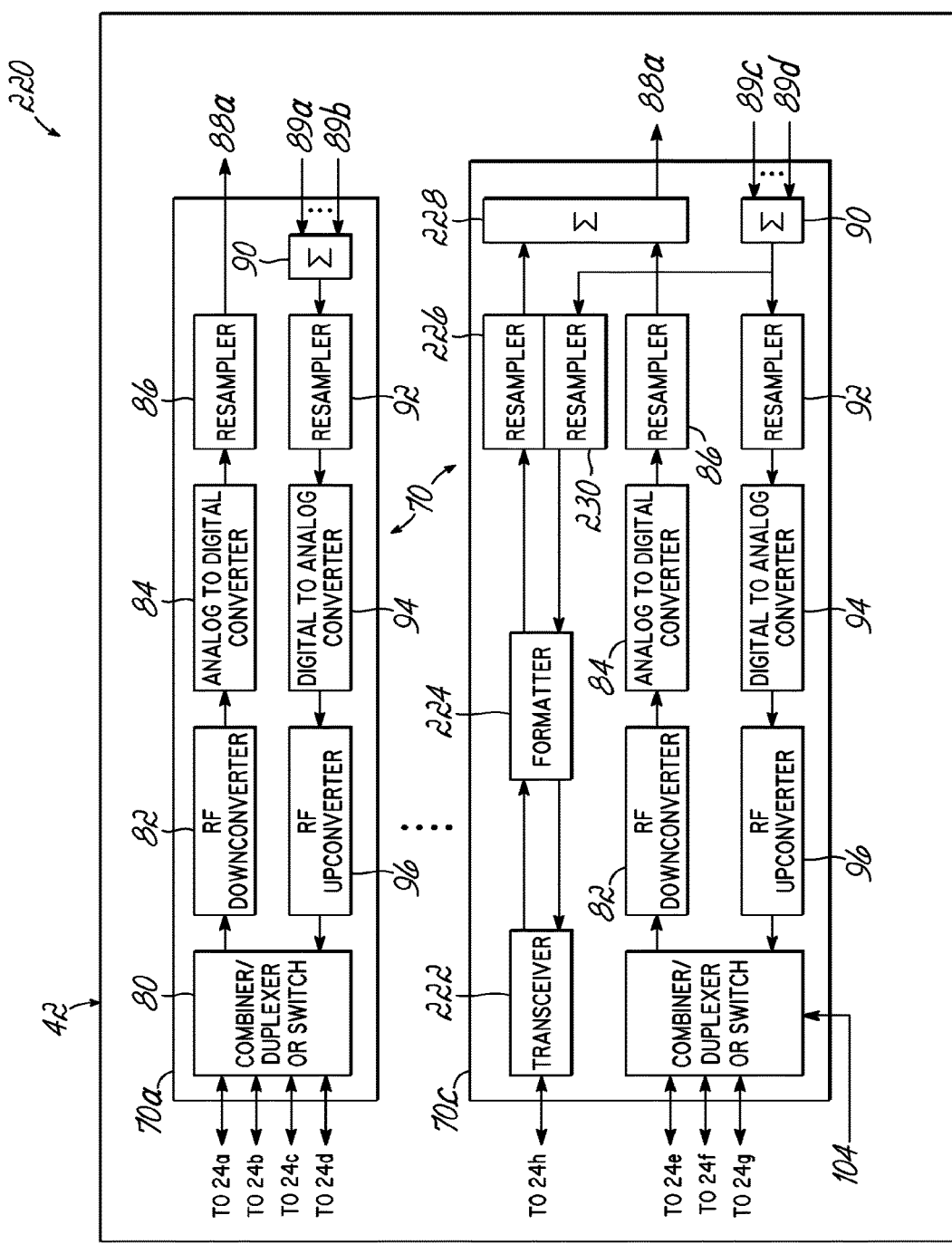

DISTRIBUTED ANTENNA SYSTEM FOR WIRELESS NETWORK SYSTEMS

CROSS-REFERENCE TO RELATED APPLICATIONS

This is a continuation application of U.S. patent application Ser. No. 12/431,872, filed Apr. 29, 2009, now allowed, the contents of which are incorporated in full by reference.

FIELD OF THE INVENTION

The present invention is directed to wireless transceiver systems for use in wireless communication systems, and specifically is directed to a distributed antenna system for the wireless transceiver system.

BACKGROUND OF THE INVENTION

Contemporary cellular phone systems and broadband wireless metropolitan networks 20, as shown in FIG. 1, are generally divided into a number of cells 22 distributed in a pattern to preclude co-channel interferences and provide coverage of mobile and fixed subscriber units operating within the service area of the system. Each cell 22 includes a base station 24 that employs radio frequency (RF) transceiver equipment, antennas 26, and wire line 28 communication equipment. Mobile/fixed subscriber units 30 within the geographic area of the cell site use RF transceiver equipment to communicate with RF transceivers within the base station 24. The base station 24 relays voice and data traffic to/from the subscriber mobile units or devices (e.g. a phone) 30 and to/from a Mobile Telephone Switching Office 32 or Access Service Gateway which in turn are connected to a central network such as the public switched telephone network (PSTN) 34 or packet switched networks such as the Internet, for example.

To improve the capacity of a base station 24 to handle more mobile users 30, cells 22 may be divided into sectors 38 or are further subdivided into smaller cells with the base station 24 being replaced with lower cost, reduced capability micro or pico cells 36. In some configurations, distributed antenna systems (DAS) may be employed to optimize the RF distribution in larger cells in order to increase capacity at an even lower cost than with pico and/or micro cells 36. These approaches permit the reuse of a limited number of expensive RF channels without incurring the costs of one or more complete base stations 24. Further, these techniques may also be used to extend coverage to areas within the cell site where RF propagation may be limited by obstruction, such as in buildings and tunnels, or to areas where the amount of traffic (revenue) does not justify the investment required for a complete base station 24. Distributed antenna systems allow the RF coverage to be adapted to the specific environment in a homogeneous way to assist in reducing the amount of introduced interference. In addition, the amount of extra traffic is kept low as only existing cells are distributed and no hand-off between cells is required.

In order to reduce the costs associated with the development of their communication systems, multiple service providers often locate their base stations 24 at the same geographical point. The providers can then share such items as antennas, antenna towers, primary power drops, land costs, and regulatory costs. These service providers may employ multiple RF bands, multiple channels within the same RF band and multiple air interface standards (e.g. CDMA, UMTS, TDMA, and WiMax). The cost for each service provider to extend coverage to increase capacity by deploying their own micro/pico cells and/or distributed antennas may be quite high. Further in some areas where RF propagation is poor, such as sporting venues or shopping malls, the owners of such facilities may not permit the installation of such equipment by multiple service providers for aesthetic reasons or because of space limitations.

Therefore, there is a need in the art for a system that maybe used by multiple service providers to extend coverage and increase capacity.

SUMMARY OF THE INVENTION

Embodiments of the present invention provide a distributed antenna system ("DAS") that can be used by multiple wireless service providers to increase the capacity and the coverage area of multiple communication systems without the need for each provider to incur the cost of deploying one or more micro/pico cells or DAS. To that end, embodiments of the invention are capable of simultaneously distributing signals between collocated base stations, operated by multiple service providers, and remote or fixed subscriber units. The signals may encompass multiple RF bands, multiple channels within those bands, and multiple air interface standards. Embodiments of the invention may provide to wireless service providers a solution that, when compared to micro cells or pico cells, allows them to cover certain environments at a lower cost with similar or even improved signal quality.

Some embodiments of the distributed antenna system include a system controller and a master unit communicating with at least one of a plurality of base stations. Remote units communicate over a high data rate media with the master unit and/or another upstream or downstream Remote unit. In some embodiments, the remote unit communicates over a digitally modulated optical channel with the master unit and/or other remote units.

In other embodiments, the distributed antenna system includes a controller and a digital time/space crosspoint switch controlled by the controller. A digitizing transceiver is in communication with the digital time/space crosspoint switch. The crosspoint switch is configured to transmit and receive digital data through the digitizing transceiver.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

FIGS. 10A and 10B are a detailed block diagram of a portion of an alternate Master Unit utilized with embodiments of the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments may have been enlarged or distorted relative to others to facilitate visualization and clear understanding. In particular, thin features may be thickened, for example, for clarity or illustration.

DETAILED DESCRIPTION OF THE INVENTION

Embodiments of the present invention provide a distributed antenna system ("DAS") that can be used by multiple service providers to increase the capacity and the coverage area of multiple communication systems without the need for each provider to incur the cost of deploying one or more micro/pico cells or DAS. To do this, embodiments of the present invention are capable of simultaneously distributing signals between collocated base stations operated by multiple service providers, employing multiple RF bands, multiple channels within those bands, and multiple air interface standards and mobile or fixed subscriber units.

Figure 1:
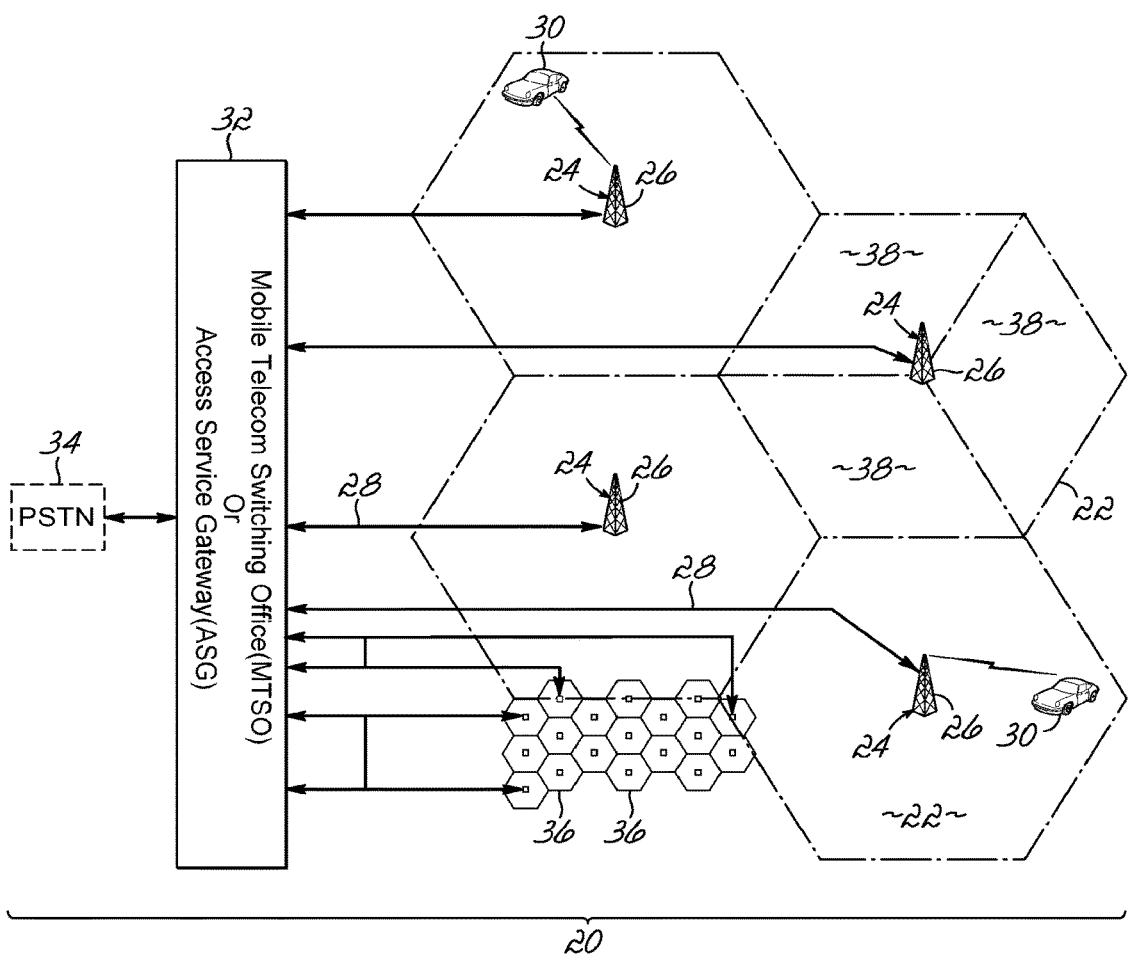
FIG. 1 is a block diagram, of a contemporary cellular phone system and broadband wireless metropolitan network.
Figure 2A:
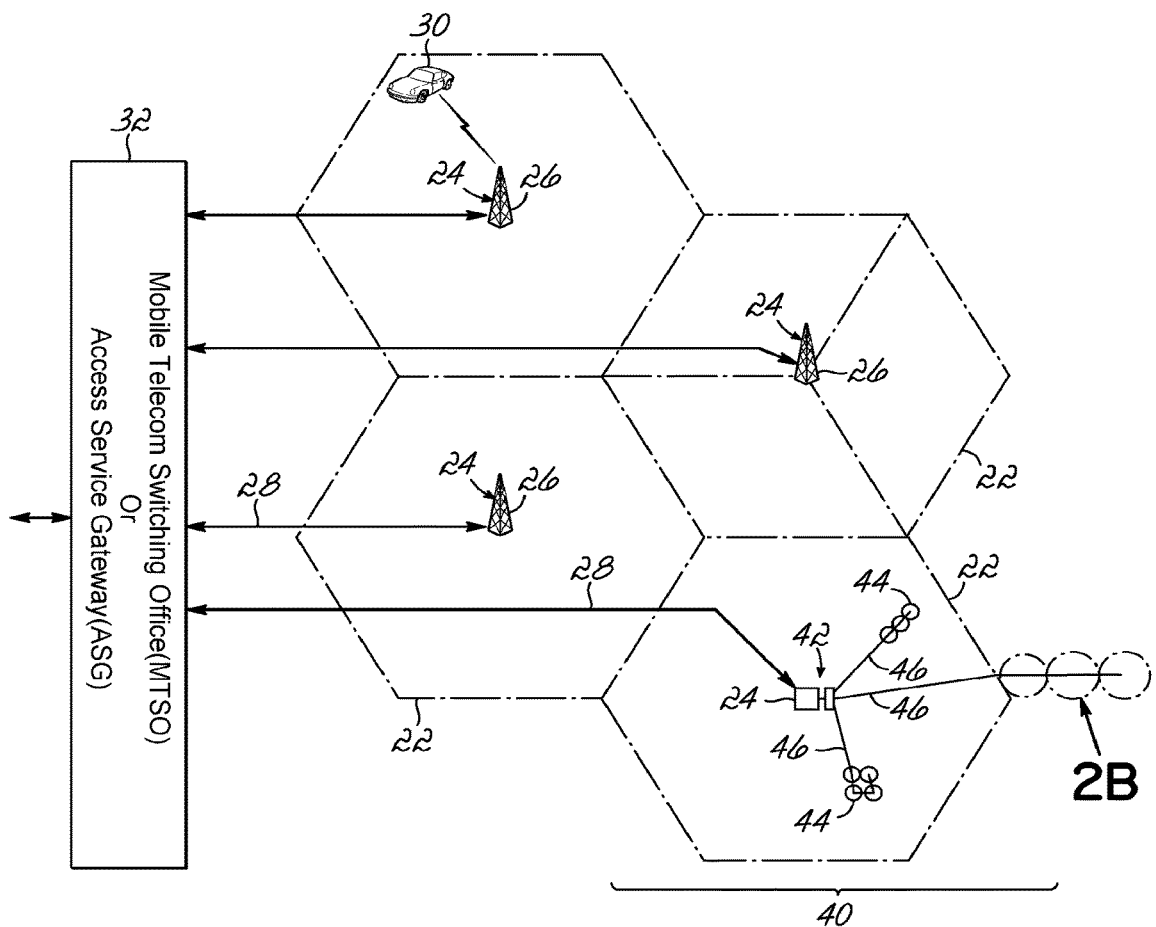
FIG. 2A is a block diagram of the cellular phone system and broadband wireless metropolitan network of FIG. 1 employing an embodiment of the invention.
Figure 2B:
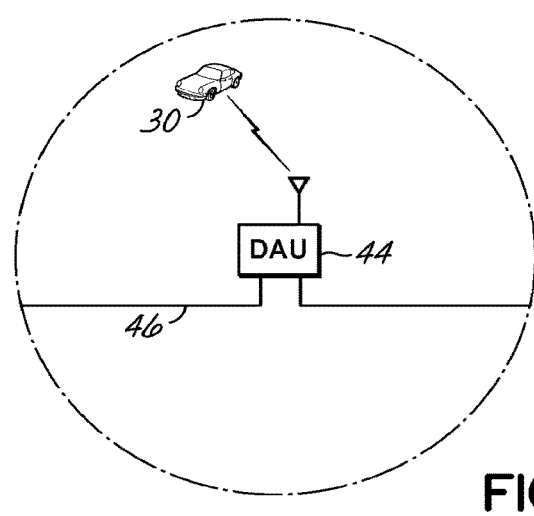
FIG. 2B is a detailed view of a portion of FIG. 2A.

The system architecture of the invention is such that the number of RF bands/air interfaces, the number of service providers that can be accommodated, and the number of distributed antennas can be tailored for each coverage scenario to minimize cost. One possible implementation 40 of the system may be seen in the exemplary embodiment illustrated in FIGS. 2A and 2B. This implementation 40 includes a Master Unit 42 collocated with at least one base station 24. The Master Unit 42 may be connected to the Mobile Telephone Switching Office 32 via a wire line 28 connection. A group of distributed antenna units 44 are interconnected via high speed digital transport links 46. The transport of RF signals in a digital format may assist in preventing any appreciable degradation due to the transport link. Spectral filtering may also be used to allow or prevent the distribution of specific radio signals. Additionally, the individual group delay of spectral components may be individually adjusted without hardware modifications. Thus, quality degrading delay differences between overlapping simulcast cells may be avoided.

The digital transport mechanism employed in embodiments of the invention allows for flexible use of the available bandwidth over the transport links. The dominant use of these links is generally for RF spectrum. A time division multiplexed format of the links permits transport of multiple signals, which may even be at the same RF frequency. Further, data from data communication links such as Ethernet may also be inserted in the digital transport links for system monitoring, configuration, control, as well as other user applications.

Figure 3:
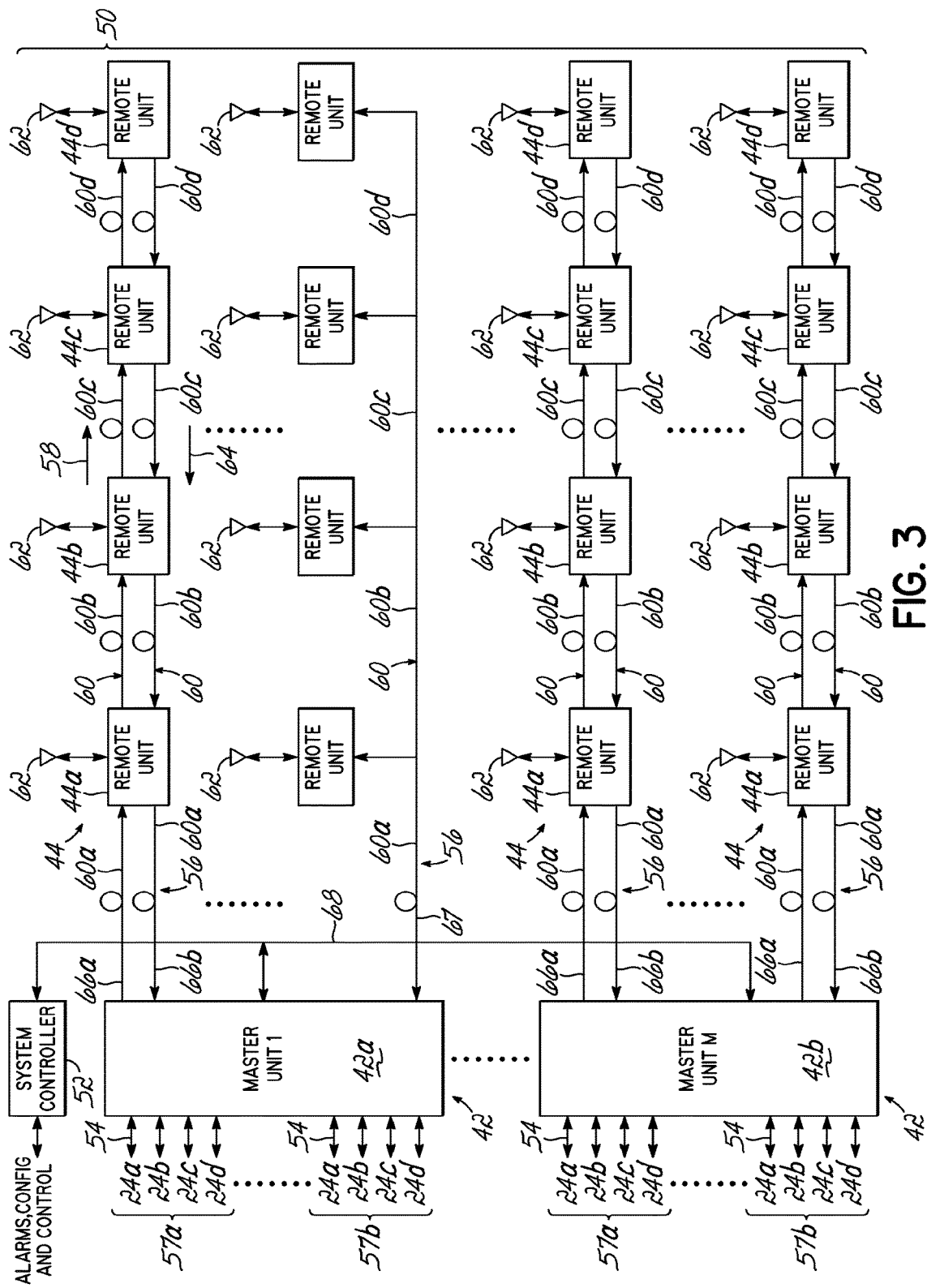
FIG. 3 is a detailed block diagram of one embodiment of the invention.

In a first embodiment of the Distributed Antenna System 50, and as seen in FIG. 3, one or more Master Units 42a, 42b and a System Controller 52 are collocated with the base stations 24a-d of one or more operators. In this embodiment, each Master Unit 42a, 42b is capable of handling up to six RF bands with up to four service providers per band for Frequency Division Duplexed (FDD) air interfaces and one operator per band for Time Division Duplexed (TDD) air interfaces, although one of ordinary skill in the art will appreciate that other Master Units may be capable of handling more or fewer RF bands, service providers or operators. The Master Units 42a, 42b are connected to the base stations 24a-d via conducted coupling interfaces 54. The Master Units 42a, 42b are also connected to a series of distributed antenna units 44, hereinafter referred to as Remote Units, via one to four wideband digitally modulated optical interfaces 56, although one of ordinary skill in the art will appreciate that other Master Units may have more than four optical interfaces. Up to four Remote Units 44 may be daisy chained along each optical interface 56. The use of multiple optical interfaces 56 permits the Remote Units 44a-d to be positioned in order to optimize coverage. The Remote Units 44a-d may also each be configured to handle up to six RF bands. Multiple Master Units 42a, 42b may be employed to provide for multiple sectors and additional service providers. One of ordinary skill in the art will recognize that more than four Remote Units 44 may be used. Similarly, one of ordinary skill in the art will recognize that more than six RF bands may also be used.

For each RF band 57a, 57b, the Master Unit 42a, 42b combines the downlink signal 58 from up to four base stations 24a-d on a per band basis and digitizes the combined signal. One of ordinary skill in the art will recognize there may be more or fewer base stations 24 communicating with the Master Unit 42a, 42b. The digitized and combined signals from each of the RF bands 57a, 57b may then be time division multiplexed into frames and converted to a single serial stream. The framed serial data is transmitted to the Remote Units 44a-d via the digitally modulated optical channels (DMOC) 60a-d. The Remote Units 44a-d convert the digitally modulated optical signal to an electrical signal, de-frame the various time slots to separate the signals from each band, de-serialize them and retransmit each band at an RF frequency, via a local antenna 62, to subscriber units 30.

The Remote Units 44a-d also receive RF voice and/or data signals, designated as the uplink signal 64, from the customer or subscriber units/devices 30 via the local antennas 62. Each RF uplink band is digitized separately. The Remote Units 44a-c may also receive a serial digital signal from the Remote Units 44b-d that precede it in the daisy chain. This digital signal contains the uplink signals received by the preceding Remote Units 44b-d. This latter signal is converted to an electrical format and the uplink signal for each band is separated and added to the locally received uplink signals from each RF band in use. The summed uplink signals for each band are combined into a single serial digital protocol and transmitted via the digitally modulated optical link 60a-d to the next Remote Unit 44a-c or the Master Unit 42a. The Master Unit 42a converts the optical uplink signals to an electrical signal, separates the signals from each band, converts them to analog signals, translates each to the appropriate radio frequency and sends them to the appropriate base stations 24a-d.

In some embodiments, the Remote Units 44a-d may allow for the implementation of several RF signals on the same frequency as may be necessary for transmit and receive diversity. This is generally implemented as dedicated hardware for the diversity path and the digitized signals may be multiplexed with the main signals on the same high speed serial link 60. The implementation is not limited to diversity. For example, MIMO (Multiple Input Multiple Output) configurations may also be used, such as configurations N×M with N transmitters and M receivers. Furthermore, the signals of multiple sectors which may occupy the same frequency band may be sent over the same Remote Unit location. Dedicated Remote Unit hardware may be required in some embodiments for this feature.

Each DMOC 60a-d is a full duplex channel that may be implemented using two fibers 66a, 66b in some embodiments as two half duplex channels, one for uplink and one for downlink data, or in other embodiments may use a single fiber 67 as illustrated in FIG. 3. In the single fiber 67 implementation, the uplink 64 signals and downlink 58 signals are carried on different wavelengths and a wavelength division multiplexer (WDM) is employed to combine or split the two optical signals. The single fiber 67 implementation may also be implemented using bi-directional optical transceivers. In some embodiments, high link margin fiber optic transceivers may be used to permit the use of existing older fiber cable which may be of poor quality or have multiple splices in order to further reduce the installation cost. The fiber may be either single or multimode optical fiber and may also be used for the transport link. The DMOC 60 including the optical transceiver 108 may also be replaced by a different transceiver for high data rate media such as coax cable, twisted pair copper wires, free space RF or optics, or shared networks such as Ethernet 68, SONET, SDH, ATM, PDH, among others.

In addition to the digitized signal from each band, the uplink and downlink digitally modulated optical links 60 also contain Operation and Maintenance (O&M) Ethernet data and one of four User Ethernet 10 Mb/s, 100 Mb/s, 1 Gb/s, or higher data rate signals. The former signal is used to configure and control the system and monitor system status. The User Ethernet signals may be used by the service providers as they see fit. The Controller 52 provides overall supervision and control of the Master 42 and the Remote Units 44 as well as alarm forwarding.

Figure 4:
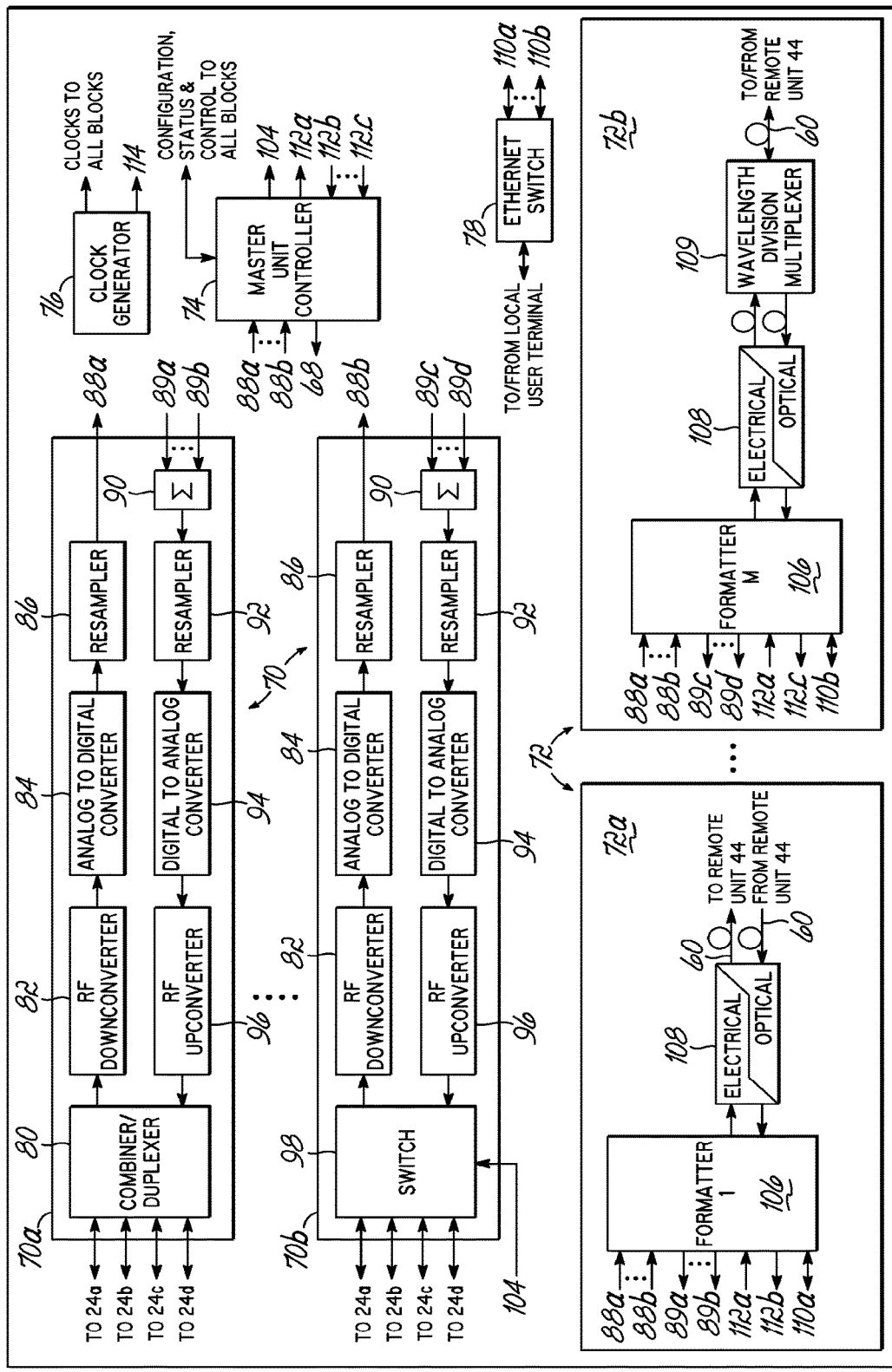
FIG. 4 is a detailed block diagram of a Master Unit used in embodiments of the invention.

Focusing now on the Master Unit 42, FIG. 4 contains a detailed block diagram of the Master Unit 42. Each Master Unit 42 may contain from one to six radio channels (hereinafter referred to as a "path") 70, from one to four digitally modulated optical channels 72, a controller 74, a clock generator 76, and an Ethernet switch 78.

In one embodiment, each radio path, such as 70a, may be configured to handle a single RF band to and from base stations 24a-d, for example. For a FDD air interface, the radio channels 70a employ a combiner and a duplexer 80 to handle the uplink signal (subscriber 30 to base station 24) and the downlink signal (base station 24 to subscriber 30). An RF downconverter 82 amplifies the received signal from the combiner/duplexer 80 (downlink signal) to ensure that an A/D converter 84 is fully loaded. The RF downconverter 82 sets a center frequency of a band within the A/D converter pass band. The wideband A/D 84 digitizes the entire downlink band of the air interface to ensure all downlink channels are digitized. A resampler 86 converts the signal to a complex format, digitally downconverts the frequency band in some cases, decimates and filters the signal, and resamples it. This reduces the amount of data associated with the downlink signal, such as 88a, that has to be transferred over the optical lines and synchronizes the rate of the digitized data to the optical network bit rate.

The uplink section of the radio channel 70a sums 90 the uplink signals, such as signals 89a-d, for its assigned band from the Remote Units 44 after they are converted to an electrical signal. The summation 90 is resampled, interpolated to change to a different data rate in some cases, and upconverted by the resampler 92 and then converted to an analog form by the D/A converter 94. The RF upconverter 96 translates the center frequency of the analog signal to the appropriate frequency for the air interface and amplifies it. The amplified signal is applied to the combiner/duplexer 80 and is routed back to the base stations 24a-d.

Figure 5:
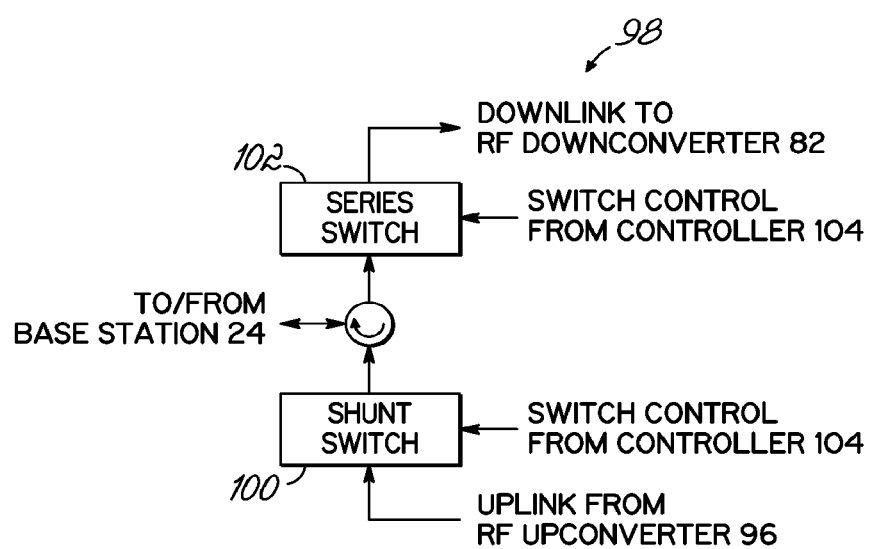
FIG. 5 is a block diagram of a TDD switch used in some embodiments of the invention.

In embodiments utilizing TDD air interfaces, the combiner and duplexer are replaced by a switching function 98 shown in FIG. 4 for example in radio channel 70b and detailed in FIG. 5. While the Master Unit 42 is receiving the downlink signal from base station 24, a RF amplifier in the RF upconverter is disabled and the shunt switch 100 shunts the RF amplifier to ground to further reduce leakage. During intervals when the Master Unit 42 is sending the uplink signal to the base station 24, the RF amplifier is enabled, the shunt switch 100 is opened and a series switch 102 is opened to protect the RF downconverter from damage due to high power levels. The switch control timing 104 is determined by the Master Unit Controller 74 from the downlink signal 88b. Additionally, the formatter 106 may apply a data compression to reduce the redundant digital information included in the serial data stream before it is sent to the transmitter in the electro-optical transceiver 108. The compression may allow for saving bandwidth or for using a less costly transceiver with lower bit rate. The compressed serial data may be converted into an uncompressed data stream after being received on the opposite ends in the optical received of 108 by the receiver side formatter 106.

Each digitally modulated optical channel 72a,b is composed of a formatter 106 and an electro-optical transceiver 108. On the outgoing side, the formatter 106 blocks, into time division multiplexed frames, the digitized downlink signal 88a-b from each RF band along with a customer Ethernet in Reduced Media Independent Interface (RMII) format 110a-b, O&M data 112a-c and synchronization information. In other embodiments, other interfaces such as MII, RMII, GMII, SGMII, XGMII, among others may be used in place of the RMII interface. The framed data may be randomized by exclusive or'ing (XOR) it with the output of a linear feedback shift register to remove long strings of logic ones or zeros. Other known coding formats such as 8 bit/10 bit or 64 bit/66 bit coding may also be used, but may result in a decrease in efficiency in the use of the digital serial link. This digital data is then converted to a serial stream which is used to modulate an optical transmitter within the electro-optical transceiver 108. In the single fiber 67 implementation, a wavelength division multiplexer (WDM) 109 is employed, such as in DMOC 72*b*, to combine or split the two optical signals.

For incoming signals from the Remote Units 44, the electro-optical transceiver 108 converts the optical signal to an electrical signal. The formatter 106 phaselocks to the incoming bit stream and generates a bit clock that is phase-locked to the data rate and aligned with the serial data stream. The formatter 106 then converts the serial stream to a parallel digital data stream, de-randomizes it and performs frame synchronization. It then breaks out the digitized uplink signal for each band, buffers each band and routes the bands to the appropriate radio channel 70*a*, 70*b*. Finally, the formatter 106 breaks out the buffers and O&M Ethernet data 112*a-c* and the user Ethernet data 110*a-b* and routes them to the Controller 74 and the Ethernet switch 78, respectively.

The Master Unit Controller 74 uses locally stored information and information from the O&M Ethernet 68 to configure and control the other blocks in the Master Unit 42. It also passes this information to the Remote Units 44 and reports status of the Remote Units 44 and the Master Unit 42 to the main Controller 52 via the O&M Ethernet 68. When a radio channel, such as 70*b*, is assigned to a TDD air interface, the Controller 74 also uses the corresponding downlink signal 88*b* to derive TDD switch control timing 104.

The System Controller 52 generally has overall system control. The Master Unit Controller 74 functions to configure individual modules as well as supervise individual modules. As part of the configuration and supervision functions, the Master Unit Controller 74 is operable to determine the uplink/downlink switch timing in TDD systems by decoding the downlink signaling or acquiring it from a different source such as the time variant UL RSSI, or some base station clock signal provided from an external source. The downlink frame clock in TDMA systems may be determined and distributed by decoding the downlink signaling to allow time slot based functions such as uplink or downlink muting, uplink or downlink Received Signal Strength Indication ("RSSI") measurements within time slots, uplink and downlink traffic analysis, etc. The Master Unit Controller 74 may detect active channels in the RF spectrum to assist in or automatically configure the filter configuration in the resampler 86, 92. Optimal leveling of the individual signals in the resampler may also be determined by measurement of the RSSI of the various signals in the downlink RF band. The Remote Unit Controller 124 may perform similar tasks in the uplink of the Remote Unit 44.

Additionally, the Master Unit Controller 74 may measure the pilot signal strength of CDMA or Orthogonal Frequency-Division Multiplexing ("OFDM") signals to properly set the level of the downlink signals, as the RSSI can vary at different capacity loading of a base station cell. The pilot signals generally remain constant with a configured ratio between pilot level and a maximum composite for full loading, the required headroom for the signals may be maintained. The Master Unit Controller 74 may also measure and supervise the signal quality of the provided downlink channels. In case of signal degradation from the base station an alarm may be set and the operator can focus on the base station without having to troubleshoot the DAS system.

In some embodiments, the Master Unit Controller 74 determines the amount of channels for a narrowband base station standard such as Global System for Mobile communications ("GSM"). Together with the measurement of the Broadcast Control Channel ("BCCH"), which is constant in power, the proper headroom that is required for a multi-channel subband may be determined and overdrive or underdrive conditions may be avoided. In other embodiments, the Master Unit Controller 74 monitors the crest factor of a transmitted spectrum in the presence of multiple channels. The crest factor may provide input to the leveling of the transmit power or the power back-off of particular gain stages of the system. The configured headroom is generally higher than the measured crest factor to avoid signal degradation due to clipping or distortion. In addition, a crest factor reduction mechanism may be employed in the resampler in some of the embodiments to reduce the crest factor and make more efficient use of the RF power amplifier in the Remote Unit 44 or assist in reducing the number of required bits per sample that need to be transmitted over the link.

The clock generator 76 may use a stable Temperature Compensated Voltage Controlled Crystal (TCVXO) to generate stable clocks and reference signals 114 for all Master Unit 42 functional blocks. Although, one of ordinary skill in the art will appreciate that other devices or crystals may also be used to generate clocking signals as long as they are capable of producing the stable clocks required by the system.

Figure 6A:
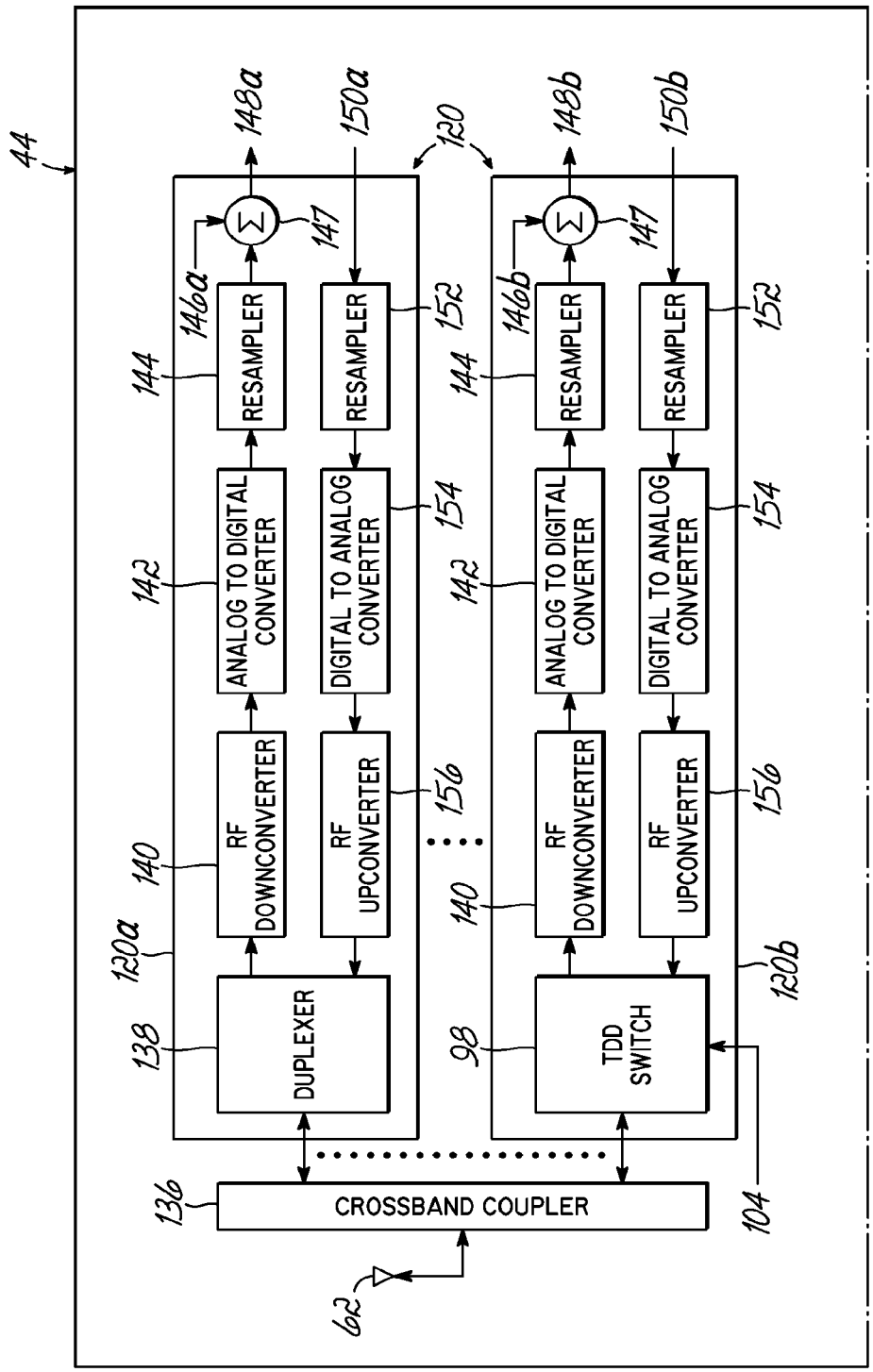
FIGS. 6A and 6B are a detailed block diagram of a portion of a Remote Unit utilized in embodiments of the invention.
Figure 6B:
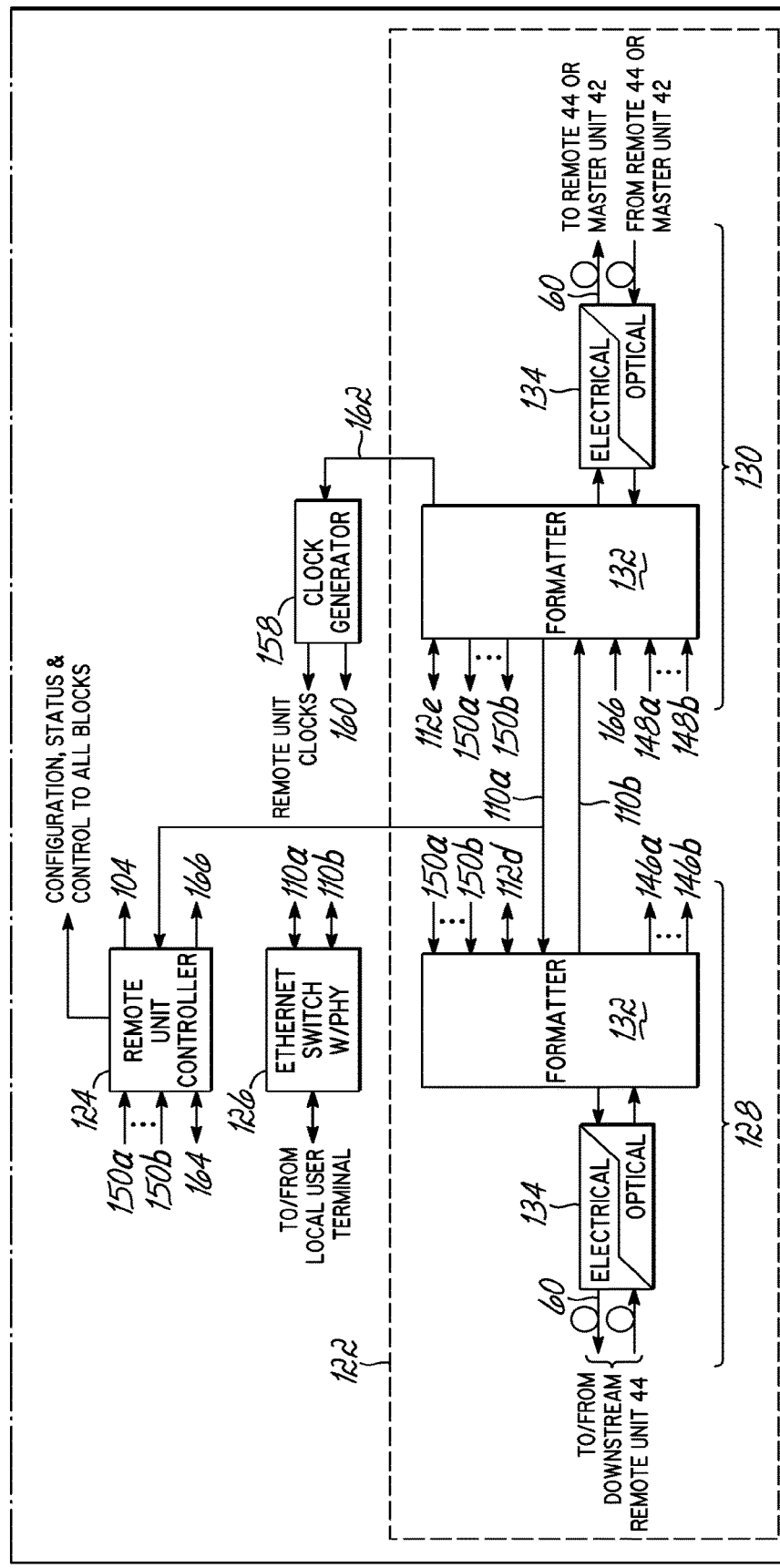

Focusing now on the Remote Unit 44, FIG. 6A and FIG. 6B contain a detailed block diagram of the Remote Unit 44. Each unit 44 may contain from one to six radio channels 120, one or two DMOCs 122, a Remote Unit Controller 124 and an Ethernet switch 126.

The DMOCs 122 may be designated as the downstream 128 and upstream channels 130. The downstream channel 128 is connected to a Remote Unit 44 that precedes this Remote Unit in the daisy chain. The upstream channel 130 is connected to a Master Unit 42 or another Remote Unit 44. The DMOC 122 functional blocks are very similar to those in the Master Unit 42. Both consist of a formatter 132 and electro-optical transceiver 134. Outgoing data is buffered, formatted into frames, randomized, parallel to serial converted and used to modulate an optical transmitter in the electro-optical transceiver 134. Incoming data is converted from an optical to electrical format, bit synchronized, de-randomized, frame synchronized and converted to a parallel format. The various data types are then broken out buffered and distributed to other function blocks within the Remote Unit 44. In some embodiments, formatter 132 may implement compression and decompression schemes to reduce bandwidth over the digital optical link.

The radio channels in the Remote Unit 44 are functionally similar to those in the Master unit 42. Each radio channel is configured to handle a single RF band. Unlike the Master Unit 42 radio channels 70, the Remote Unit 44 radio channels 120 are connected via a cross band coupler 136 to an antenna 62. For FDD air interfaces, the radio channels, such as radio channel 120*a*, employ a duplexer 138 to split the uplink (subscriber 30 to base station 24) and the downlink signal (base station 24 to subscriber 30). Duplexers, cross-band combiners and couplers may be optional for some embodiments of either the Master Unit 42 or Remote Units 44. In these embodiments, additional antennas may replace the duplexer 138 and cross-coupler 136 in the Remote Units 44. Extra cables would be required in the Master Unit 42. A RF downconverter 140 amplifies the received uplink signal from the antenna 62 to ensure an A/D converter 142 is fully loaded and sets the center frequency of the band within the A/D converter pass band. The wideband A/D 142 digitizes the entire uplink band of the air interface to ensure all uplink channels are digitized. A resampler 144 converts the uplink signal to a complex format, digitally downconverts the signal in some cases, decimates and filters the signal, and resamples it with a multi-rate filter bank. This reduces the amount of data that has to be transferred over the optical links and synchronizes the rate of the digitized data to the optical network bit rate. The output of the resampler 144 is added to the uplink signals 146a from the downstream Remote Units 44 in summer 147. The summed uplink signal 148a for each band is then sent to a formatter 132 in the upstream channel 130 in the DMOC 122.

The downlink signal 150 for each band (150a, 150b) is interpolated and frequency shifted in the resampler 152. The group delay of individual spectral components can be adjusted via filters or delay elements in the resampler 152. The signal is then converted to an analog form by the D/A converter 154. The RF upconverter 156 translates the center frequency of the analog downlink band to the appropriate frequency for the air interface and amplifies it. The amplified signal is then applied to the antenna 62 and transmitted to the subscriber units 30.

For TDD air interfaces, the duplexer 138 is replaced by the switching function 98 shown in radio channel 120b and FIG. 5. While the Remote Unit 44 is receiving the uplink, the RF power amplifier in the RF upconverter 156 is disabled and the shunt switch 100 shunts the RF power amplifier to ground to further reduce leakage. When the Remote Unit 44 is transmitting the downlink signal, the RF power amplifier is enabled, the shunt switch 100 is opened to permit the downlink signal to reach the antenna 62 and the series switch 102 is opened to protect the RF downconverter 140 from damage due to high power levels. As with the Master Unit 42, the switch control timing 104 is determined by the Controller 124 from the downlink signal 150a, 150b.

The clock generator 158 includes a Voltage-controlled Crystal Oscillator (VCXO) that is phaselocked to the incoming serial data stream bit rate via a narrowband phaselocked loop (PLL). The VCXO output is split and is used as the frequency reference 160 for the local oscillators in each radio channel 120a,b, the sampling clocks for the A/D 142 and D/A 154 converters, and a clock for the other blocks in the Remote Unit 44. One of ordinary skill in the art will realize that the long term frequency accuracy should be good to ensure the local oscillators are on frequency and that the short term jitter levels should also be low to ensure that the jitter does not corrupt the A/D and D/A conversion processes. By phaselocking to the data rate of the optical link, which is derived from the stable TCVCXO in the Master Unit 42, the Remote Unit 44 does not require an expensive oven compensated oscillator or a GPS disciplining scheme to maintain long term frequency accuracy, thereby, making the more numerous Remote Units 44 less expensive. The use of a narrow band PLL and a crystal controlled oscillator may assist in reducing short term jitter for the A/D and D/A converter clocks. Using the recovered, jitter reduced clocks 162 to re-clock the transmit data in the optical links at each Remote Unit 44 reduces jitter accumulation which may assist in improving A/D and D/A converter clocks in the downstream Remote Units 44 and may assist in reducing the bit error rate (BER) of the optical communication channels 122.

The Remote Unit Controller (RUC) 124 uses locally stored information and information from the O&M Ethernet 68 to configure and control the other blocks in the Remote Unit 44. Downstream RMII 112d and upstream RMII 112e may also be supplied to the formatter 132. In addition, local O&M data 166 may be configured at a local O&M terminal 164. Remote Unit 44 also passes this information to the up and downstream Remote Units 44 and/or Master Unit 42.

The RUC 124 additionally uses the appropriate downlink signal to derive TDD switch control timing 104 when required.

Figure 7A:
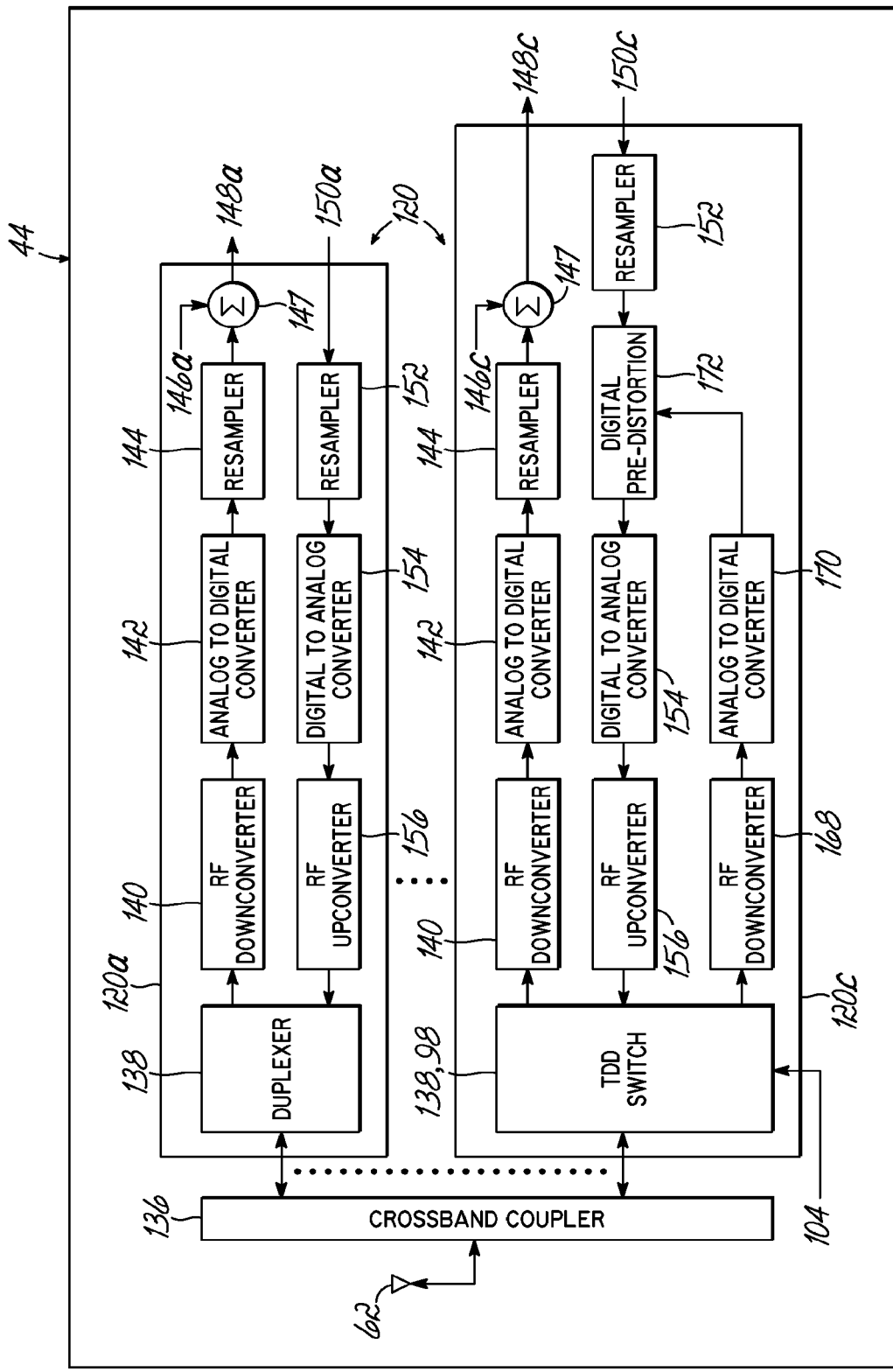
FIGS. 7A and 7B are a detailed block diagram of a portion of an alternate Remote unit utilized in embodiments of the invention.
Figure 7B:
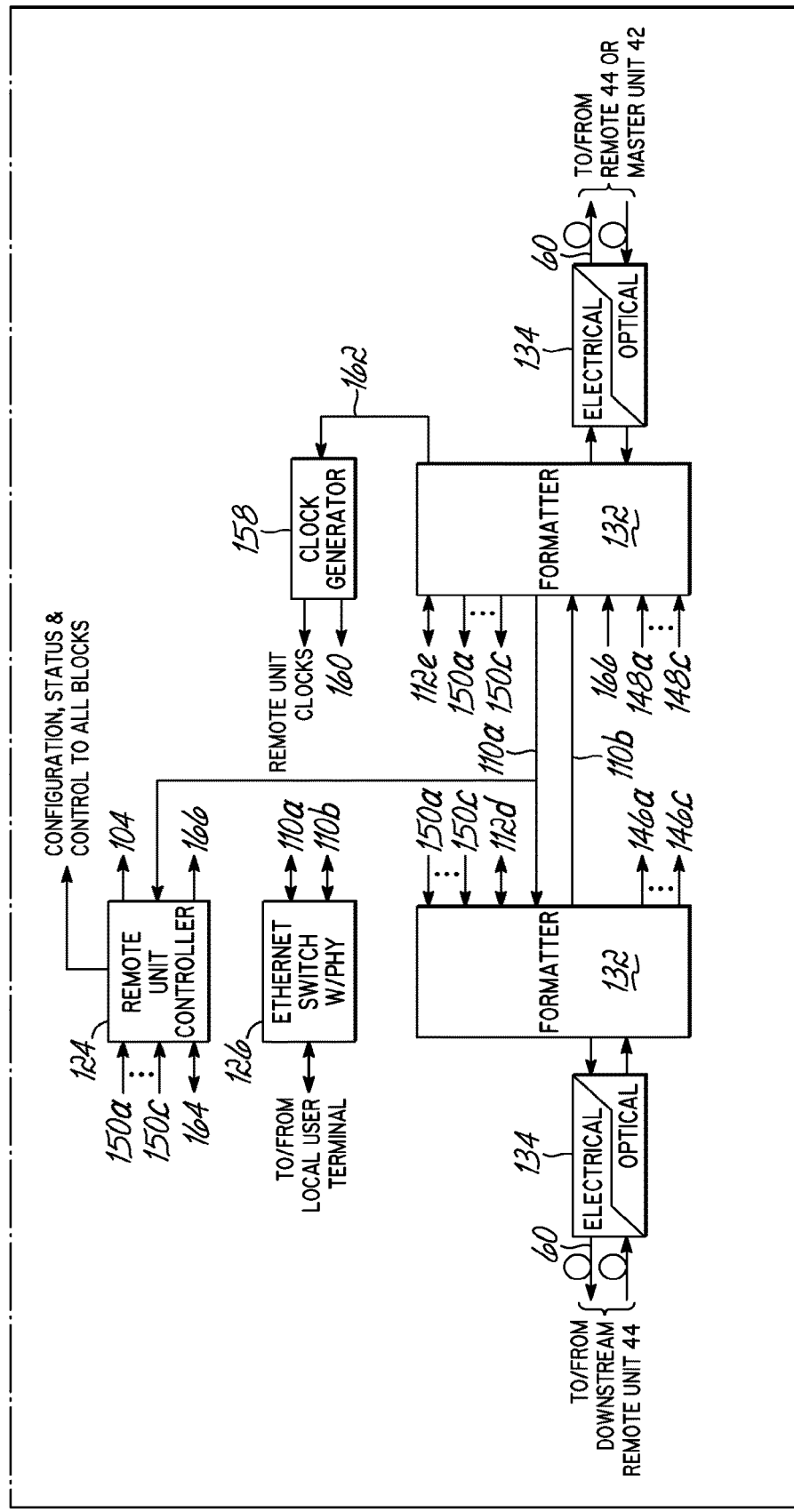

In an alternate embodiment of the radio channel 120c utilized in a Remote Unit 44, the radio channel 120c may also employ digital pre-distortion to linearize the power amplifier. This embodiment of the radio channel 120c in a Remote Unit 44 is shown in the block diagrams of FIGS. 7A and 7B. In this embodiment, a third signal path may be added to one or more radio channels 120c. The third path couples off the downlink signal after power amplification and digitizes it. The signal from the antenna 62 is received in an RF downconverter 168, which amplifies the received signal to ensure an A/D converter 170 is fully loaded and sets the center frequency of the band within the A/D converter pass band. The wideband A/D 170 digitizes the entire uplink band of the air interface to ensure all uplink channels are digitized. The digitized signal is compared to a delayed version of the downlink signal in the digital pre-distortion unit 172 and the difference is used to adaptively adjust the gain and the phase of the signal prior to D/A conversion to correct for non-linearity in the power amplifier.

Figure 8:
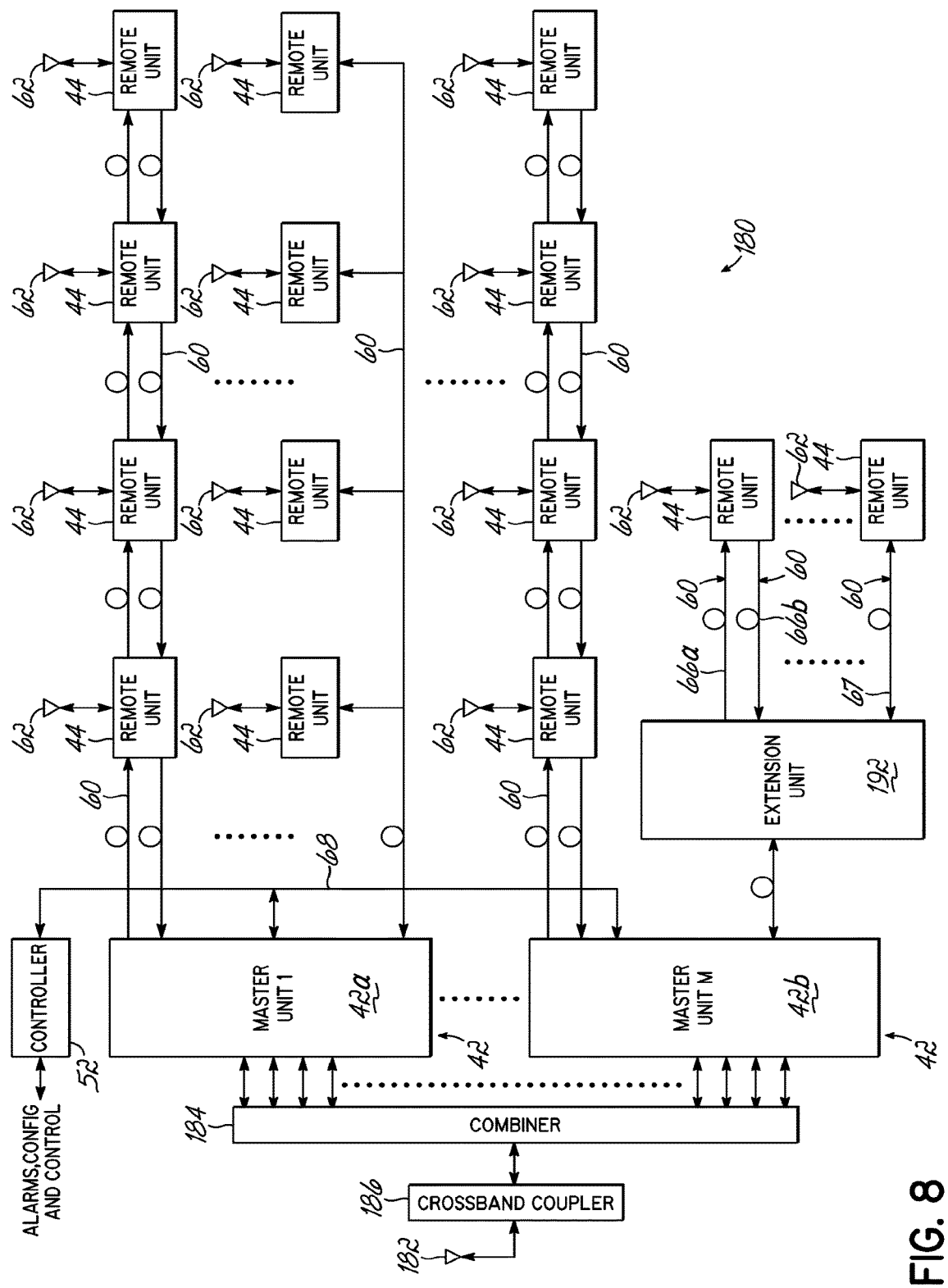
FIG. 8 is a detailed block diagram of an embodiment of the invention including an Extension Unit.

In an alternate embodiment of the Distributed Antenna System 180, the Master Units 42a,b are not collocated with the base stations 24. In this embodiment, the Master Units 42a,b are connected to an antenna 182 and the wire line interfaces to the base stations are replace by a multi-band RF link, as depicted in FIG. 8, including a combiner 184 and a crossband coupler 186. The combiner 184 and crossband coupler 186 work to both combine and divide signals from each of the base stations 24 of the multiple service providers. This configuration still permits multiple service providers to use the system thereby retaining the cost benefits of only deploying one system while extending coverage further than can be done with the embodiments having a collocated system. Additionally, in this embodiment, the combiner/duplexer 80 in the Master Unit 42 may be replaced with a duplexer. As with other embodiments, each Master Unit 42 may support up to six RF bands, though in other embodiments the number of RF bands may be more than six.

In another embodiment of the Distributed Antenna System, and as also depicted in FIG. 8, one of the optical links from the Master Unit 42 may be connected to an Extension Unit 192. In this embodiment, the Master Unit(s) 42 may be collocated with the base station(s) 24 as shown in FIG. 3, or the Master Unit(s) 42 may be not be collocated with the base station(s) 24 as shown in FIG. 8. The Extension Unit 192 provides additional digitally modulated optical links for distribution of voice and data traffic, command and control, and user data for to up to nine Remote Units 44, thereby, increasing the number of Remote Units 44 a single Master Unit 42 can handle. The Extension Unit 192 may communicate with Remote Units 44 using a two fiber 66a, 66b approach using the same wavelength in both directions, or Extension Unit 192 may communicate using a single fiber 67 using two wavelengths and a WDM (204 in FIG. 9).

Figure 9:
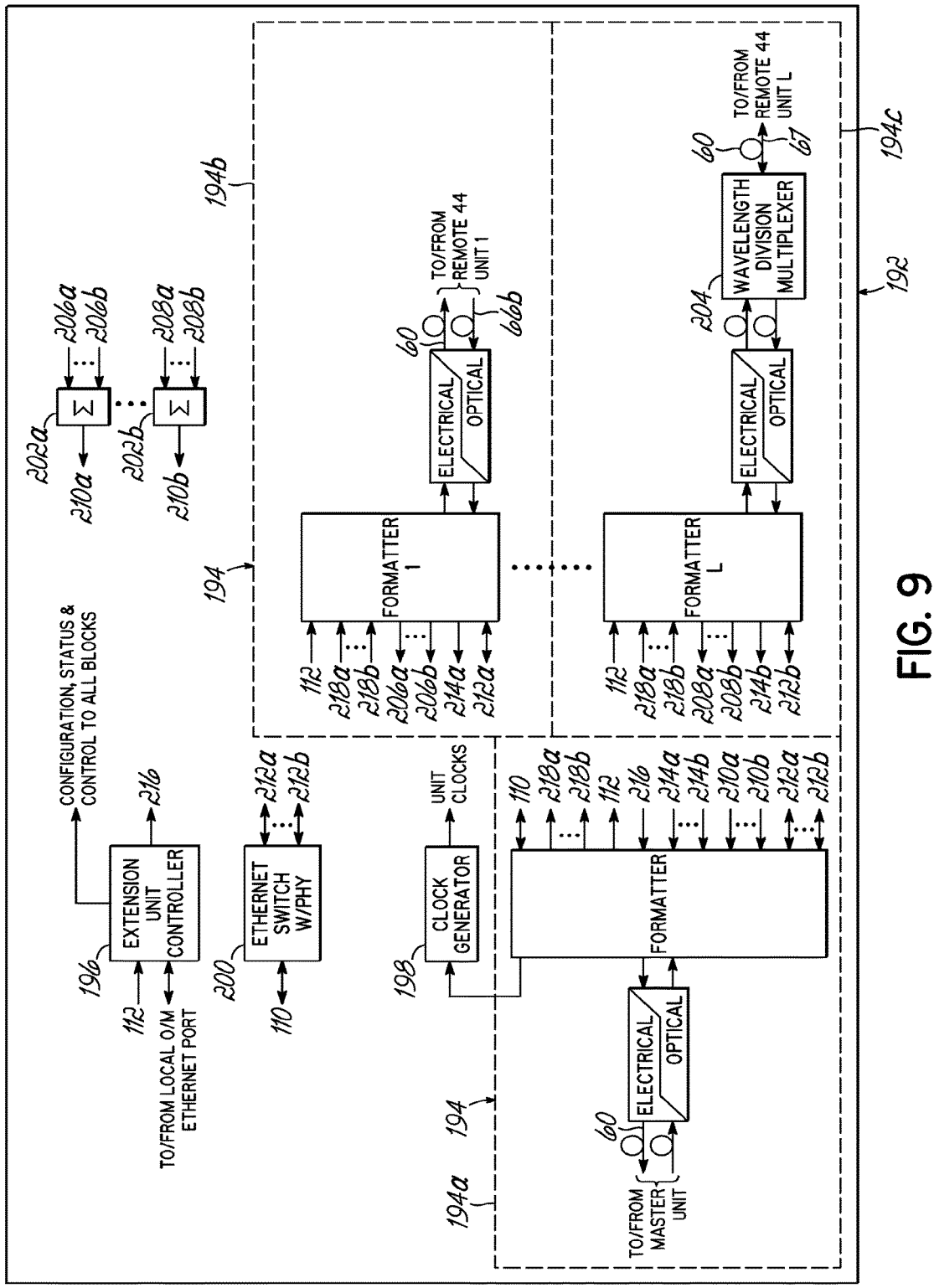
FIG. 9 is a detailed block diagram of a portion of the Extension unit of FIG. 8.

FIG. 9 is a detailed block diagram of an Extension Unit 192. The Extension Unit includes DMOCs 194, a controller 196, a clock generator 198, an Ethernet Switch 200 and summers 202. One of the DMOCs 194a connects to the Master Unit 42 while the remaining DMOCs 194b-c each connect to a different Remote Unit 44. The DMOC 194a connected to the Master Unit 42 fans out data from the Master Unit 42 to the other DMOCs 194b-c. Data from each Remote Unit 44 is converted to an electrical format by the DMOCs 194b-c and is combined into a single framed optical stream and sent to the Master Unit 44. As with the other units, the DMOC can employ two fibers 66*a*, 66*b* or a single fiber 67 using two wavelengths and a WDM 204. The clock generator 198 generates clocks for all Extension Unit 192 functions by phaselocking a VCXO to the rate of the serial bit stream from the Master Unit 42 in the same manner employed in the Remote Unit 44 above.

The summers 202*a*, 202*b* for each band combine the digitized uplink data 206*a-b* or 208*a-b* for that band from each Remote Unit 44 for transmission to the Master Unit 42. This the combined uplink data 210*a*, 210*b* assists in reducing the bit rate on the optical link to the Master Unit 42.

Master Unit 42 O&M data 112 is transmitted to the Extension Unit Controller 196 and all of the Remote Units 44. User data (User RMII data 212*a*, 212*b*) for each of the remote units is also sent to all of the Remote Units 44 and the Extension Unit Ethernet Switch 200. O&M data (including local O&M data 216 and O&M data 214*a*, 214*b* from the Remote Units 44) and user data 212*a*, 212*b* from the Remote Units 44 and the Extension unit 192 is framed and sent to the Master Unit 42.

The Ethernet Switch 200 routes the user Ethernet data 110 (including 110*a*, 110*b* from FIG. 4) from the Master Unit 42 to/from the Remote Units 42. The Extension Unit Controller 196 uses locally stored information and information from the O&M Ethernet to configure and control the other blocks in the Extension Unit 196.

In another embodiment of the Distributed Antenna System 220, one or more of the analog RF interfaces with the base station 24 may be replaced with interfaces that carry the uplink and downlink signals in a time division multiplexed frame digital format such as a Common Public Radio Interface (CPRI) or the Open Base Station Architecture Initiative (OBSAI) link. For FDD air interfaces the interface is full duplex, so the physical layer of each interface can employ two conducted coupling interfaces or two fiber optic channels or a single fiber channel that uses WDM. For TDD air interfaces, the interface is half duplex so the physical layer can employ a conducted coupling interface or a single fiber employing TDM or two fibers. Single or multimode fibers can be employed.

Figure 10B:
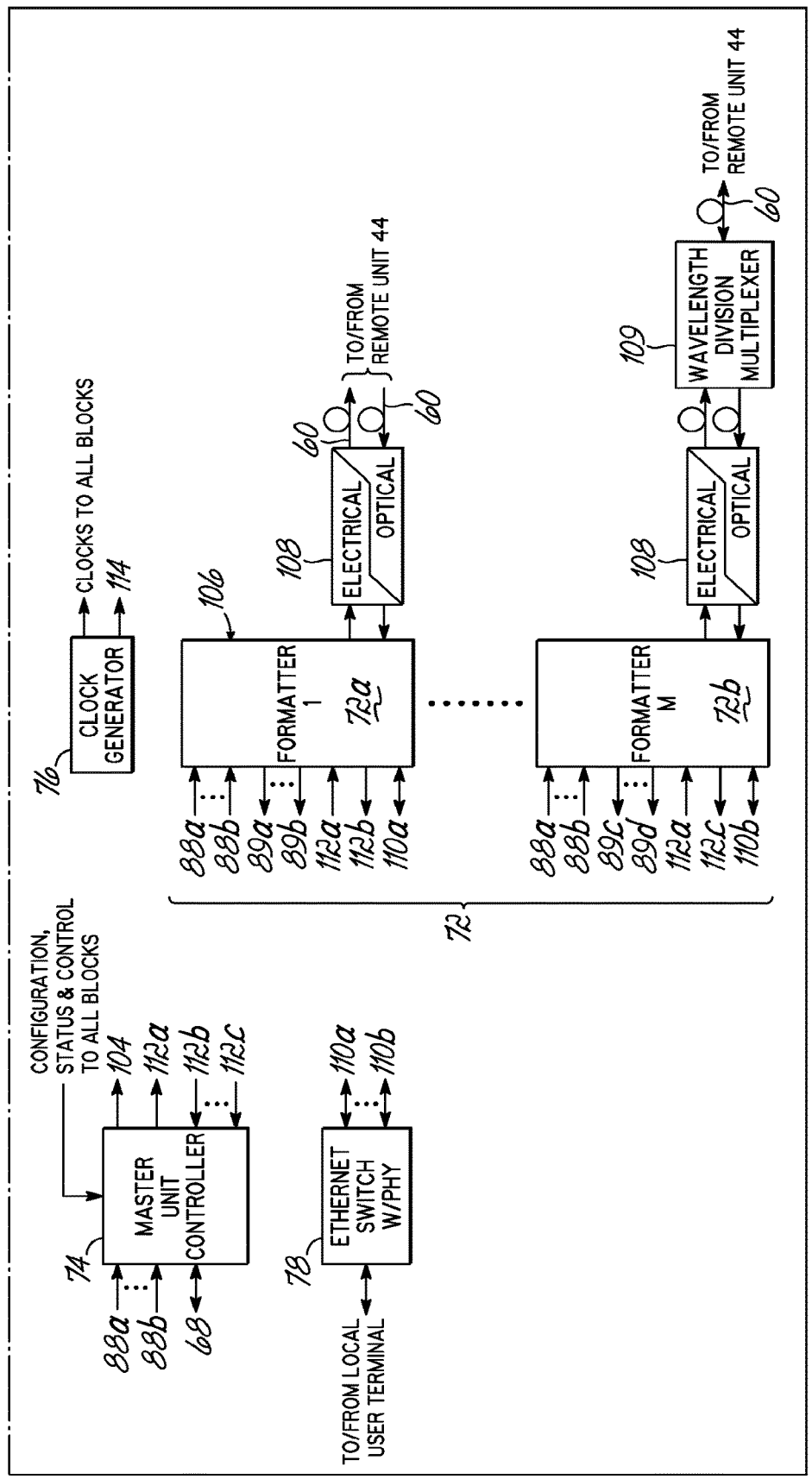

In this embodiment, the radio channel 70*c* of the Master Unit 42 is modified as shown in FIGS. 10A and 10B to permit operation with digitized or analog RF signals. FIG. 10A depicts one radio channel 70*a* with four analog RF base station interfaces 24*a-d* and one radio channel 70*c* with three analog RF interfaces 24*e-g* and one digital RF interface 24*h*. For FDD air interface standards, each RF band may be configured to accommodate any combination of digital and analog RF interfaces up to a sum total four. For TDD interfaces, only a single interface, either digital or analog, may be accommodated.

For the digital RF base station interface 24*h*, a transceiver 222 converts the signal from the interface physical layer format (Optical, Ethernet, Low Voltage Differential Signaling (LVDS)) to standard logic levels. A formatter 224 de-frames and bit synchronizes the signal, decodes the signal, performs a parallel to serial conversion and rate buffers the signal. A resampler 226 converts the signal to a complex format if required, decimates and filters the signal and re-samples it. This reduces the amount of data that has to be transferred over the optical links 60 and synchronizes the rate of the digitized data to the optical network bit rate. The re-sampled digitized RF signal is summed in summer 228 with the composite digitized RF signal from any analog RF channels and the resulting summation 88*a* is transmitted to the Remote Units 44.

The uplink signal for the given band from each group of Remote Units 44 is summed in summer 90 and re-sampled in resampler 230. The re-sampling converts the summed signal to the sampling rate and bandwidth of the digitized RF link. The formatter 224 then frames the data, codes the data, converts it to a serial format and divides it in to packets if necessary. The transceiver 222 converts it the appropriate physical layer for the interface.

Figure 11:
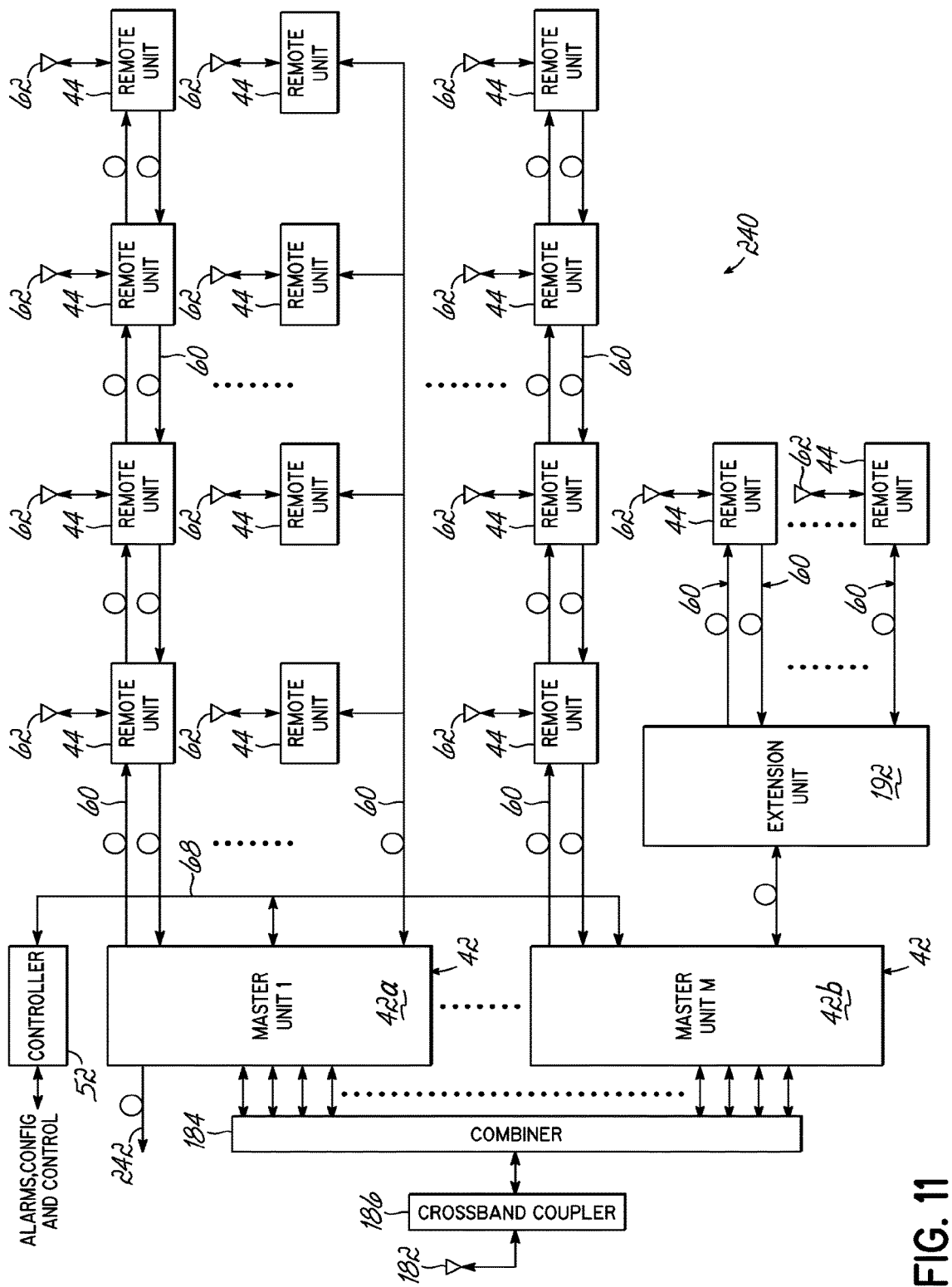
FIG. 11 is a detailed block diagram of a cellular phone system and broadband wireless metropolitan network according to one of the embodiments of the invention.
Figure 12A:
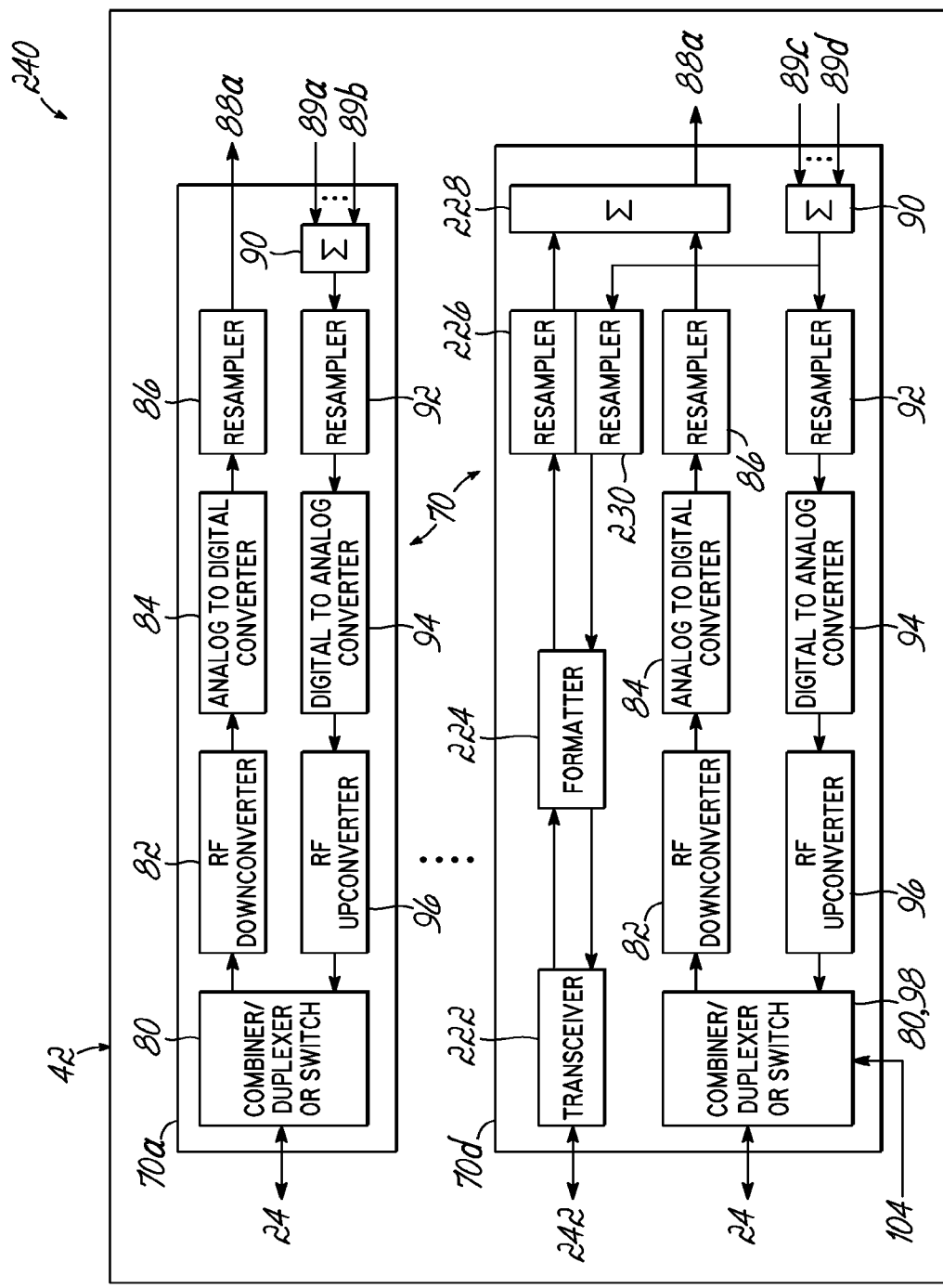
FIGS. 12A and 12B are a detailed block diagram of a portion of another Master Unit similar to that of FIGS. 10A and 10B utilized with embodiments of the invention.
Figure 12B:
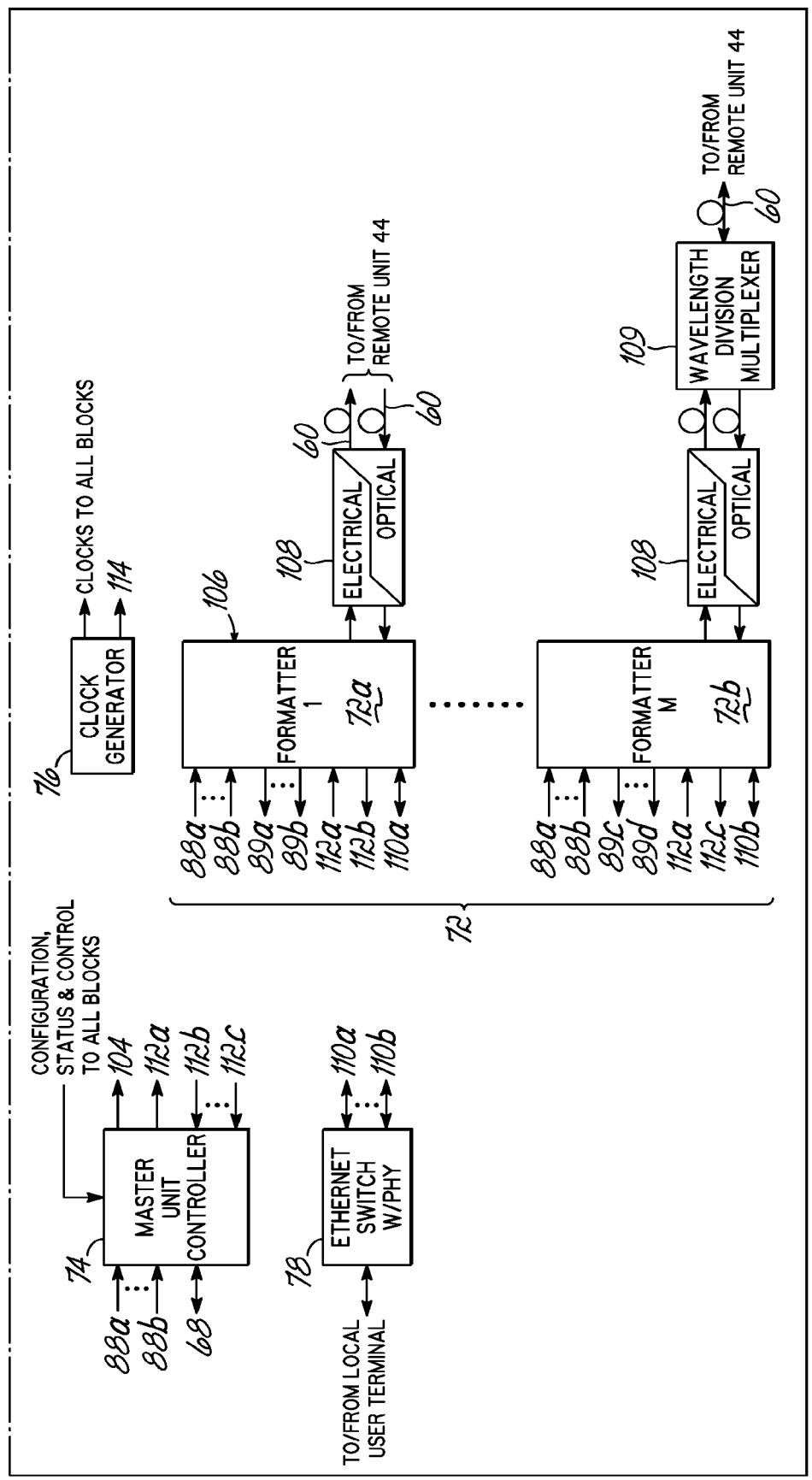

In another embodiment of the Distributed Antenna System 240, Master Units 42 not collocated with the base stations can exchange digitized RF signals 242 with those base stations in addition to the broadcast analog RF signals, as shown in FIG. 11. In this variation of the invention, the Master Unit Radio Channels 70 are modified as shown in FIGS. 12A and 12B, by the addition of a digital RF channel (s). The operation of the digital channel is identical to the one in FIGS. 10A and 10B. Multiple digital radio channels can be employed for each band.

Figure 13:
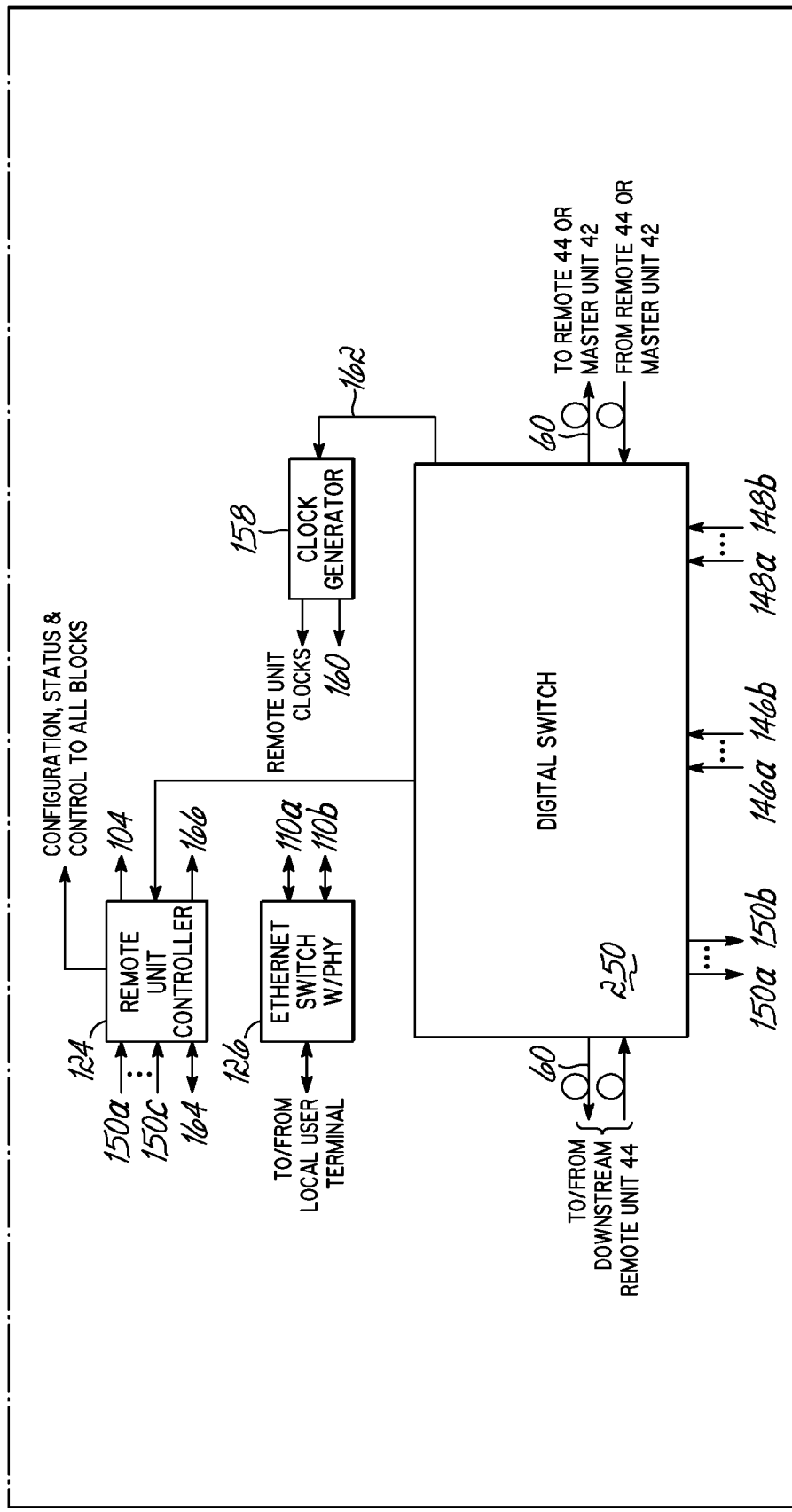
FIG. 13 is an alternate exemplary embodiment of a remote unit, such as in FIGS. 6A-6B and 7A-7B utilizing a digital crosspoint switch.

In an alternate configuration of the Distributed Antenna System, digital transceivers may create the data stream. In this configuration, the formatters and electrical/optical links may be replaced with Digital Crosspoint Switches 250 as seen in the exemplary block diagram in FIG. 13. A digital system may be implemented such that the distribution of signal streams may be configured employing digital time/space crosspoint switches, as illustrated, for example in FIG. 13.

Figure 14:
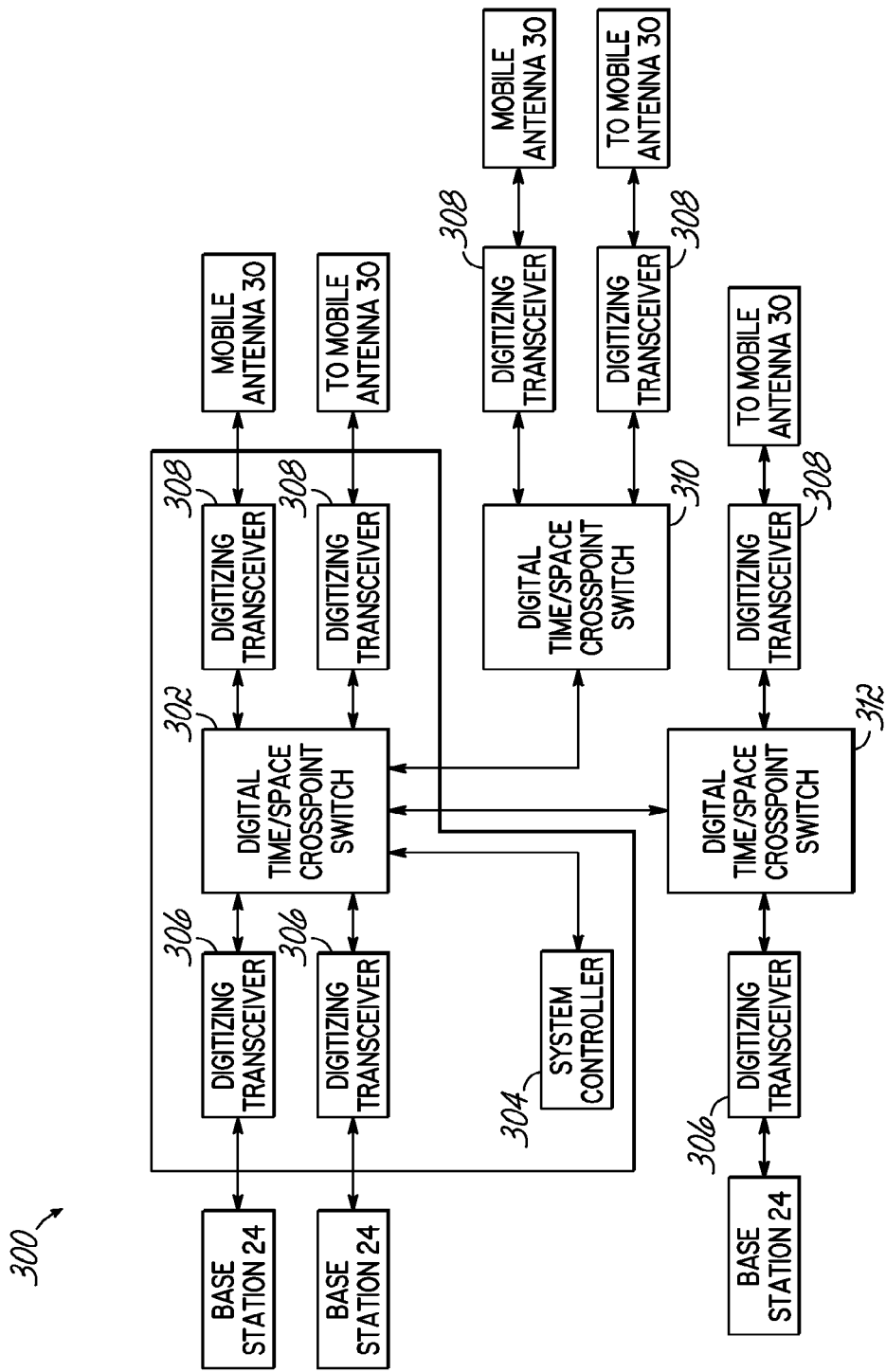
FIG. 14 is a block diagram of a master and remote/extension units employing digital crosspoint switched.

FIG. 14 is a block diagram of an exemplary digital RF distribution and switching architecture 300 for base stations and their corresponding remote units. Using a crosspoint switch 302, multiple base stations may be combined over a single digital link. All signals between the head-end and remote unit may be routed through a switch 302 allowing any input to be connected to any output. This architecture may also have multiple switching matrices that could be used to implement more complex distribution schemes. A conference bridge type of functionality in the switches may be used to combine the uplink signals 64 on one channel that come from different mobile units 30.

The digital architecture 300 may be under the control of a system controller 304 that controls, coordinates and operates the digital time/space crosspoint switch 302. The switch 302 transmits and receives digital data through digitizing transceivers 306 which may replace the radio channels 120 of embodiments discussed above. Some of the digitizing transceivers 306 convert the analog downlink signals of the base stations 24 to digital signals and transmit those digital signals to the switch 302. Other digitizing transceivers 308 convert the digital downlink signals to analog and transmit to the mobile units 30. Similarly, for uplink signals, the digitizing transceivers 308 convert the analog signals from the mobile units to digital signals and transmit those signals to the switch. Digitizing transceivers 306 convert the digital uplink signals to analog to send to the base stations 24. Additional crosspoint switches may also be used to expand the coverage such as with a switch 310 acting as an extension unit connecting through digitizing transceivers 308 to additional mobile units 30. Additional switches, such as switch 312, may also be added from switch 302 to expand coverage between additional base stations 24 and mobile units 30.

The use of uplink muting may assist in reducing the noise in the uplink signals that are coupled into the base station input when there are no active mobile units. This may be implemented in some embodiments using RSSI base detection as well as sophisticated detection of even CDMA uplink signals. In a case of an uplink signal reaching and being received by multiple Remote Units, a maximum ratio combining mechanism may be used. The combining mechanism may be better suited for narrowband signals than for wide band signals due to the increased decorrelation of the wide bandwidth signals and their increased immunity to fading.

Figure 15A:
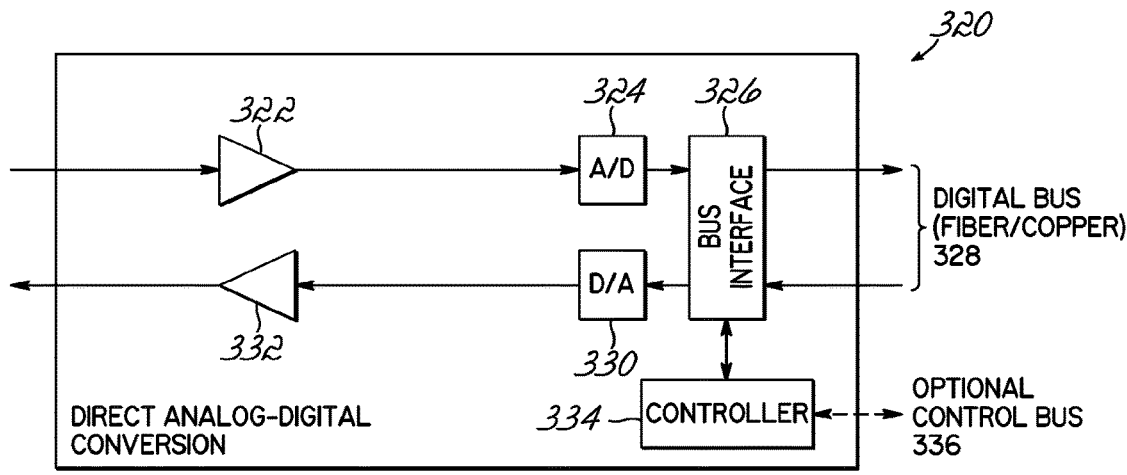
FIG. 15A-C are block diagrams of different types of digital transceivers.
Figure 15B:
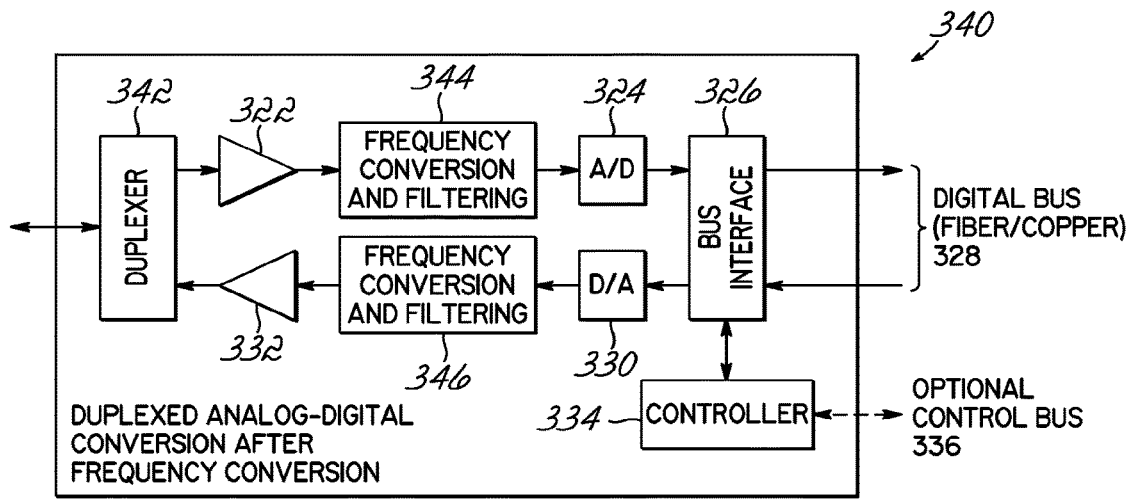
Figure 15C:
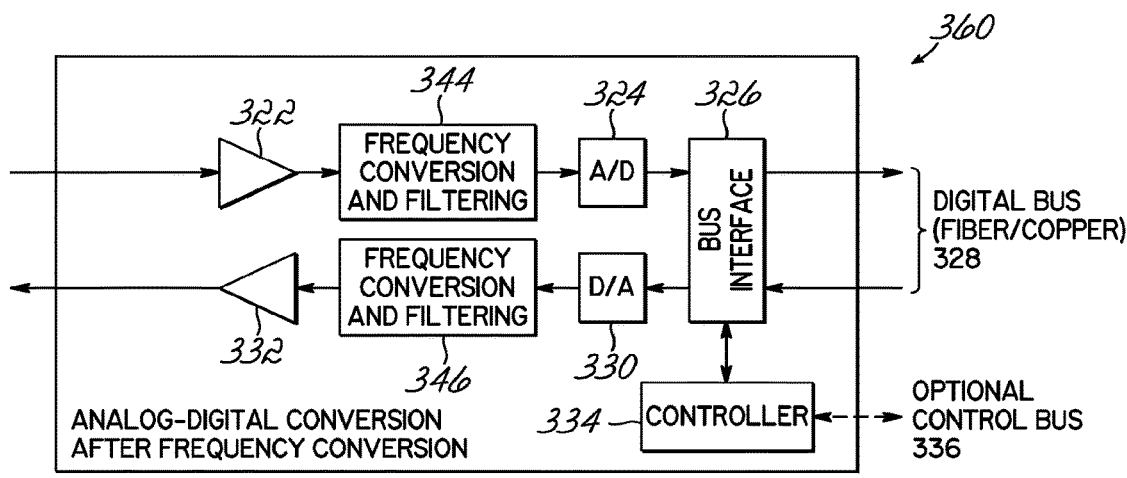

FIGS. 15A-15C illustrate several types of digital transceivers 306, 308 that may be used with embodiments of the digital architecture 300 discussed above. For example in FIG. 15A, a digital transceiver 320 may be configured for a direct analog-digital conversion with power amplifier 322 amplifying incoming downlink signals. The amplified downlink signals are converted to digital signals with A/D converter 324 and are put on bus interface 326 in preparation for sending them on a digital bus 328 to a crosspoint switch, such as switch 302. The digital bus may be optical fiber, coaxial cable, twisted pair copper wires, free space RF for optics, or may even share existing networks such as Ethernet in some embodiments. Uplink signals are received at bus interface 326, converted from digital to analog with D/A converter 330 and amplified with power amplifier 332 before transmitting. A controller 334 with an optional controller bus 336 may be utilized in some embodiments for controlling the incoming and outgoing signals on the bus 328.

FIG. 15B illustrates a digital transceiver 340 with duplexed analog-digital conversion after frequency conversion. The duplexer 342 in the transceiver 340 may implement a full duplex channel as two half duplex channels, one for uplink and one for downlink data in some embodiments, or in other embodiments may use a single channel. In the single channel implementation, the up and downlink signals may be carried on different wavelengths and a wavelength division multiplexer (WDM) (not shown) may be employed to combine or split the signals. In this embodiment, a signal is received at the duplexer 342 and split off as a downlink signal prior to being amplified by power amplifer 322. The amplified signal is frequency converted and filtered at block 344 before being converted to digital with A/D converter 324. The digital signal is then placed on the bus interface 326 and transmitted over bus 328 similar to the embodiment above. Uplink signals are received on the bus interface 326 and converted from digital to analog with D/A converter 330. The analog signals are then frequency converted and filtered at block 346 before being amplified by power amplifier 322. The amplified uplink signal is then sent through duplexer 342 prior to being transmitted back to a base station 24, for example. The embodiment of a digital transceiver 360 in FIG. 15C is similar to this embodiment, though the digital transceiver 360 in FIG. 15C does not contain a duplexer. Digital filtering may be used to save bandwidth on the optical link if only selected parts of an RF band are transmitted. Filtering and decimation also assist in reducing the sampling rate for an RF band.

Figure 16:
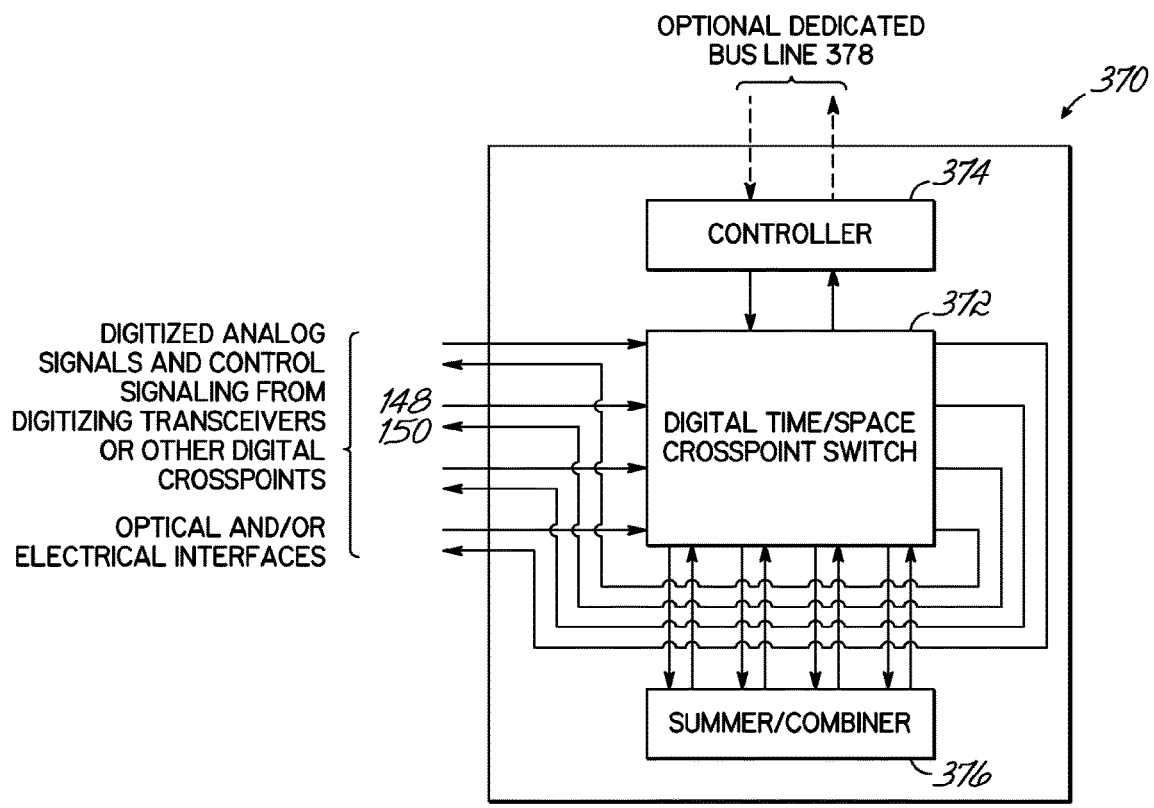
FIG. 16 is a block diagram of a digital crosspoint switch with a combining/summing function.

FIG. 16 illustrates a block diagram of an alternate digital time/space crosspoint switch 370 with a combining function. This embodiment contains the crosspoint switch 372 under the control of control 374, similar to system controller 304 in FIG. 14. The controller 374 may communicate with other controllers or the system control 304 over an optional dedicated control bus 378. The switch 372 receives signals such as signals 148 and 150 from the embodiments illustrated in FIGS. 6A, 6B, 7A, and 7B. Additionally, a summer/combiner 376 may be employed for uplink signals, intelligently summing the signals and not the noise for transmission. Muting techniques may be used to reduce uplink noise for channels where there are not uplink transmissions from mobile units 30. The switch may be configured in a point-multipoint configuration where a single downlink signal may be repeated and transmitted over multiple outputs to other switches, remote units or mobile units 30.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A master unit for a telecommunications system, the master unit comprising:
    an analog interface configured for receiving RF signals from at least one base station and digitizing the RF signals to generate first digitized RF signals;
    a digital interface configured for receiving second digital signals transmitted in digital form from the at least one base station, wherein the digital interface comprises:
    a resampler configured for re-sampling the second digital signals into re-sampled second digital signals having a data rate that is less than an original data rate of the second digital signals;
    a combiner configured for combining the first digitized RF signals and the re-sampled second digital signals into a combined digital signal; and
    a transmitter configured for providing the combined digital signal to a remote unit capable of wirelessly transmitting information represented by at least part of the combined digital signal, wherein the data rate corresponds to a bit rate of a network coupling the master unit to the remote unit.

2. The master unit of claim 1, wherein the second digital signals comprise digital signals in a standardized format.

3. The master unit of claim 2, wherein the standardized format comprises one of Common Public Radio Interface format or Open Base Station Architecture Initiative format.

4. The master unit of claim 1, wherein the network is an optical network.

5. The master unit of claim 1, wherein the digital interface comprises:
    a transceiver configured to convert the second digital signals from a physical layer format to standard logic levels;
    circuitry configured to generate a processed second digital signals by:
    de-framing and bit-synchronizing the second digital signals;
    decoding the second digital signals;
    performing a parallel to serial conversion on the second digital signals; and
    rate buffering the second digital signals,
    wherein the resampler is configured to generate re-sampled second digital signal by re-sampling the processed second digital signals.

6. The master unit of claim 1, wherein the analog interface comprises a second resampler configured for re-sampling the first digitized RF signal to a second data rate that is less than a second original data rate of the first digitized signal,
    wherein the combiner is configured for combining the re-sampled second digital RF signals with the first digitized RF signals by combining the re-sampled second digital signals with the re-sampled first digitized RF signals.

7. The master unit of claim 6, wherein the combiner is a summer.

8. The master unit of claim 6, wherein the analog interface further comprises:
an RF downconverter configured for generating a downconverted RF signal from a received RF signal; and
an analog to digital converter configured for generating the first digitized RF signal from the downconverted RF signal and providing the first digitized RF signal to the second re-sampler.

9. The master unit of claim 1, wherein the master unit is disposed in a distributed antenna system comprising a plurality of remote units to which the transmitter is configured to transmit the combined digital signal.

10. The master unit of claim 1, further comprising:
circuitry configured to phase-lock a digital bit stream comprising digitized uplink RF signals received from the remote unit and to generate a bit clock that is phase-locked to a data rate of the digital bit stream.

11. The master unit of claim 1, wherein the at least one base station is a plurality of base stations that comprise:
a first base station for providing the RF signals; and
a second base station for providing the second digital signals.

12. A distributed antenna system, comprising:
a master unit comprising:
an analog interface configured for receiving RF signals from at least one base station and digitizing the RF signals to generate first digitized RF signals;
a digital interface configured for receiving second digital signals transmitted in digital form from the at least one base station, wherein the digital interface comprises:
a resampler configured for re-sampling the second digital signals into re-sampled second digital signals having a data rate that is less than an original data rate of the second digital signals; and
a combiner configured for combining the first digitized RF signals and the re-sampled second digital signals into a combined digital signal; and
a remote unit configured for receiving the combined digital signal over a communication medium and for wirelessly transmitting information represented by at least part of the combined digital signal, wherein the data rate corresponds to a bit rate of the communication medium.

13. The distributed antenna system of claim 12, wherein the master unit is configured for distributing digitized RF signals associated with a plurality of wireless protocols,
wherein the remote unit comprises:
a first remote unit configured for wirelessly transceiving RF signals associated with at least one of the plurality of wireless protocols and for communicating combined digitized RF signals with the master unit over a multi-mode fiber optic cable; and
a second remote unit configured for wirelessly transceiving RF signals associated with at least one of the plurality of wireless protocols and for communicating combined digitized RF signals with the master unit over at least one single-mode fiber optic cable.

14. The distributed antenna system of claim 12, wherein the remote unit is configured for wirelessly communicating RF signals with a mobile device,
wherein the master unit is configured for digitizing RF signals in a plurality of frequency bands and associated with a plurality of wireless protocols.

15. The distributed antenna system of claim 12, wherein the remote unit comprises a first remote unit and a second remote unit, wherein the communication medium comprises a first communication medium and a second communication medium, the distributed antenna system further comprising:
an extension unit configured for receiving the combined digital signal from the master unit over a fiber optic cable and for providing the combined digital signal to the first remote unit over the first communication medium and to the second remote unit over the second communication medium.

16. The distributed antenna system of claim 12, wherein the remote unit is configured for providing an uplink digitized signal to the master unit, the uplink digitized signal representing communication information wirelessly received from at least one mobile device,
wherein the analog interface is configured for receiving the uplink digitized signal and for converting a first part of the uplink digitized signal to a first uplink RF signal,
wherein the digital interface is configured for receiving the uplink digitized signal and for formatting a second part of the uplink digitized signal into a second uplink RF signal,
wherein the master unit is configured for providing the first uplink RF signal and the second uplink RF signal to the at least one base station.

17. The distributed antenna system of claim 12, wherein the master unit further comprises circuitry configured to phase-lock a digital bit stream comprising digitized uplink RF signals received from the remote unit and to generate a bit clock that is phase-locked to a data rate of the digital bit stream.

18. The distributed antenna system of claim 12, wherein the digital interface comprises:
a resampler configured for re-sampling the second digital signals to a data rate that is less than an original data rate of the second digital signals, wherein the combiner is configured for combining the first digitized RF signals and the second digital signals into the combined digital signal by combining the re-sampled second digital signals with the first digitized RF signals.

19. A method, comprising:
receiving, by a first unit, analog RF signals from a first base station;
digitizing, by the first unit, the analog RF signals to generate first digitized RF signals;
receiving, by the first unit, second digital signals transmitted in digital form from a second base station;
re-sampling, by the first unit, the second digital signals into re-sampled second digital signals having a data rate that is less than an original data rate of the second digital signals;
combining, by the first unit, the first digitized RF signals and the re-sampled second digital signals into a combined digital signal; and
providing the combined digital signal to a second unit located remotely to the first unit over a communication medium, wherein the data rate corresponds to a bit rate of the communication medium.

* * * * *